(12) United States Patent
Carpenter

(10) Patent No.: US 9,468,154 B2
(45) Date of Patent: Oct. 18, 2016

(54) TOWER PLANTER GROWTH ARRANGEMENT AND METHOD

(76) Inventor: Tim Dewey Carpenter, Summerfield, FL (US)

( * ) Notice: Subject to any disclaimer, the term of this patent is extended or adjusted under 35 U.S.C. 154(b) by 73 days.

(21) Appl. No.: 14/131,432

(22) PCT Filed: Jul. 7, 2011

(86) PCT No.: PCT/US2011/043140
§ 371 (c)(1),
(2), (4) Date: Jan. 7, 2014

(87) PCT Pub. No.: WO2013/006174
PCT Pub. Date: Jan. 10, 2013

(65) Prior Publication Data
US 2014/0208647 A1     Jul. 31, 2014

(51) Int. Cl.
*A01G 9/02*     (2006.01)
(52) U.S. Cl.
CPC .................... *A01G 9/023* (2013.01)
(58) Field of Classification Search
CPC ......... A01G 9/02; A01G 9/022; A01G 9/023
USPC .......... 47/82, 83, 86, 39, 46, 47, 67, 70, 44, 47/41.14
See application file for complete search history.

(56) References Cited

U.S. PATENT DOCUMENTS

| | | | | |
|---|---|---|---|---|
| 5,305,551 A * | 4/1994 | Orlov | ................. | A01G 9/023 47/79 |
| 5,598,662 A * | 2/1997 | Droste | ................. | A47G 7/041 47/39 |
| 6,092,333 A * | 7/2000 | Steffan | ................. | A01G 9/023 47/83 |
| 6,470,625 B1 * | 10/2002 | Byun | ................. | A01G 9/023 47/82 |
| 6,840,008 B1 * | 1/2005 | Bullock | ................. | A01G 9/023 47/82 |
| 7,152,370 B2 * | 12/2006 | Caron | ................. | A01G 27/04 47/82 |
| 2003/0188480 A1 * | 10/2003 | Whitcomb | ............. | A47G 7/085 47/72 |
| 2008/0190019 A1 * | 8/2008 | Hart | ................. | A01G 9/12 47/47 |
| 2008/0236040 A1 * | 10/2008 | Sheaffer | ................. | A01G 9/02 47/65.6 |
| 2011/0030274 A1 * | 2/2011 | Buist | ................. | A01G 1/007 47/65.6 |
| 2011/0219688 A1 * | 9/2011 | Nelson | ................. | A01G 9/02 47/65.8 |

* cited by examiner

*Primary Examiner* — Thien Thanh Pham
(74) *Attorney, Agent, or Firm* — Dorothy S. Morse

(57) ABSTRACT

A tower planter growth arrangement comprising towers (2) allowing plant/crop production to be commercially competitive with commonly-used field cultivation for selected crops and ornamental plants. It has risers (12) of different lengths that permit a variable number of growing pots (4) in stacked array on a center support pipe (6), a new pot (4) design configured for improved drainage and reduced shipping damage, modified tower rotation plates (8) adapted to accommodate the new pot (4) drainage design, optional protective sleeves (20) for pots (4) that extend their useful life, an optional ground pot (18) that can collect excess water/nutrient drip for growing bonus plants/crops, an optional weighted support pot (52), an optional overhead nutrient distribution system (24), optional internal ground supports/stakes (14), optional support plates (10), and optional use of a nutrient distribution pot (22) above the top growing pot (4) in each tower (2). Applications include, but are not limited to, home and commercial use for growing a wide variety of crops and ornamental plants.

4 Claims, 12 Drawing Sheets

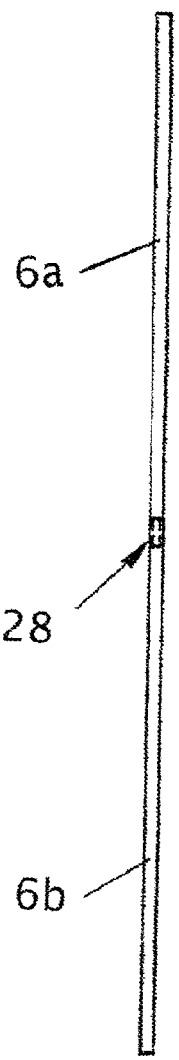
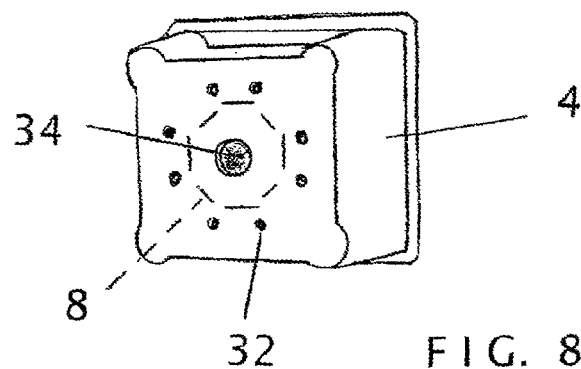
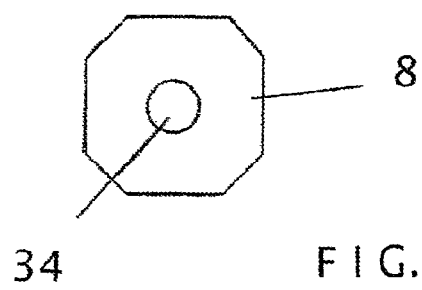
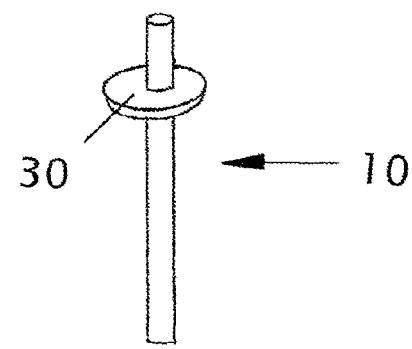
FIG. 7　　　　FIG. 8
FIG. 9
FIG. 10

TOWER PLANTER GROWTH ARRANGEMENT AND METHOD

TECHNICAL FIELD

This invention relates to systems and methods for plant cultivation that use multiple planters positioned in vertical elevation relative to one another, specifically to an improved system and method of plant growth in self-sustaining vertical towers that provide a commercially viable alternative to common field cultivation practices for many crops and ornamental plants. The size and design of the growing pot used is critical for commercial success. They are purposefully small in size (about 1 gallon) for financial advantage, since in combination with timed hydroponic feeding of plants in present invention growing pots, a reduced amount of growing media still allows optimal plant growth while lowering production cost. Also, present invention growing pots have been improved with different sizes and placement of drain holes to provide quick drip-to-excess flow of water/nutrient through them that prevents excess fluid accumulation in any stacked pot, while concurrently providing water/nutrient distribution downwardly through all stacked growing pots to achieve saturation of all growing media, including growing pot corners where plant roots are anchored. Furthermore, present invention growing pots are preferably made from high-density expanded polystyrene foam that provides enhanced pot strength for less breakage during handling and longer reuse, as well as successful post-manufacture drilling of growing pot center holes to enlarge them (without material crumbling or fragmentation) as needed to adapt the pots for use with larger diameter support pipes in taller towers, outdoor applications, and/or for growing different crops/plants. Present invention growing pots are also 100% recyclable and provide good root insulation for enhanced plant growth, all of which boost commercial success. In addition, when non-soil growing media is used in its stacked growing pots, and ground cover is also placed under present invention towers, plant disease and susceptibility to insects is substantially reduced, and the absence of weeds resulting from ground cover use makes herbicide application unnecessary, providing cleaner plants and fruit that substantially reduce health hazard risk to workers and purchasers of crops and plants. Furthermore, the type of crop or ornamental plant to be grown in present invention towers determines plant density within each growing pot needed for optimal growth, with plant type, available light, intended application (commercial or other), and environmental factors (i.e. wind) being important considerations in determining tower height, as tower collapse is a potential risk when plants increase in size/mass and become too heavy for the lowest growing pots therein. Accordingly, in addition to having knowledge about the type of plants/crops being grown, selections of growing pot size, structural features to enhance growing pot strength, materials used to enhance growing pot strength, tower height, and the type/weight/porosity of growing media during and after fluid saturation must be carefully considered to prevent avoidable tower collapse and achieve successful crop/plant production. Additionally, the number of stacked growing pots used in each present invention tower often varies according to the type of plants grown, with complementary risers of differing lengths placed under stacked growing pots (or between growing pots) to create a uniform tower height among neighboring towers that permits use of the same overhead irrigation without modifying it, (even if different plants/crops are selected for growth), reducing crop/plant production cost.

When practical or economical, a ground pot can be used under present invention growing pots to further increase plant density and yield in each tower without a corresponding increase in acreage (and/or between adjacent rows of present invention towers), with a ground pot utilizing all (or at least most) excess water/nutrient exiting the bottom stacked growing pot above it. In the alternative, present invention ground pots can collect and direct excess water/nutrient to a remote location for plant growth or other use. Also, ground pots placed between rows of present invention towers can have a separate irrigation line. As plants in growing pots above a present invention ground pot increase in size and progressively need more water/nutrient, the timing and/or volume of fluid added to each tower will likely need to be increased to provide optimal plant growth in the ground pot, unless the ground pot is given a separate line to supplement its irrigation. Ground pots are particularly useful for growing root crops and larger plants not easily grown in stacked present invention growing pots, but may also grow some (or all) of the same crops/plants found in the growing pots positioned above them.

The present invention system and method have both commercial and residential applications, with its goal simply being to grow more plants with less acreage, less water, less nutrients, and less energy, while at the same time requiring reduced labor to harvest and care for plants. For reduced cost in commercial applications, growing pots in each present invention column/tower have the same size and configuration, and also have a square cross section so that top corners of adjacent growing pots are off-set approximately 45-degrees from the top corners of the next higher/lower pots to allow room for plant growth from the corners of the next lower growing pot. Grooves in the middle top edge of each side of a present invention growing pot establish the precise/interlocked positioning of all stacked growing pots in a tower that enhances present invention tower stability as plant mass increases, and have been resized to accommodate growing pots with and without protective sleeves around them. In outdoor applications, reuse of growing pots multiple times is critical for commercial success, and a hard plastic sleeve is preferably used around present invention stacked growing pots to protect them from solar UV radiation and extend their life, with sleeves in residential and other applications also providing decorative and/or advertising functions. Thus, improvements in the present invention include a change in pot design for enhanced downward nutrient drip from one growing pot to the next, a beveled top growing pot edge for reduced breakage of pots and plant stems, a resized groove in the top edge for locking adjacent growing pots together when needed both with and without an outer sleeve, enhanced growing pot strength (from increased wall thickness and other structural change) that augment commercial success by reducing growing pot damage during transport/cleaning/handling, modified tower rotation means, and quick disconnect two part center support pipes that allow easy assembly of higher towers for larger yields without an increase in acreage. Additional tower options in the present invention may include an overhead nutrient distribution system, a tubular emitter holder associated with the top end of its central support pipe, a nutrient distribution pot situated above its topmost growing pot, an internal support/stake within the central pipe at ground level that resists damage from shearing forces (weather related and other), a support pot (a pot filled with concrete or other weighted material) which secures the bottom end of a tower's center support pipe, and/or a support plate and spacer assembly that prevents growing pots from sinking into the ground as plant and fruit mass increases and is placed at the base of a tower when a ground pot is not employed. Present invention towers 2 do not change the way plants grow, and most reach upward to absorb sunlight. However, some plants grown in field cultivation, such as tomatoes and cucumbers, must be tied up or staked, which is time consuming. Present invention towers 2 allow plants that might otherwise need to be staked to hang naturally from growing pots 4, without the labor and material cost associated with infield tying or staking.

BACKGROUND ART

The original stackable growing pot tower arrangement was disclosed by Dov Orlov in U.S. Pat. No. 5,136,807 (1992), with an improved variation thereof disclosed in his U.S. Pat. No. 5,305,551 (1994). His first towers comprised vertically stacked growing pots formed into self-sustaining columns and an excess-fluid drain system, wherein water/nutrient introduced to the topmost pot and not used by plants passed downwardly through drain holes into the next lower pot, and so on, with any water/nutrient exiting the bottom growing pot being received by a drain system beneath it. Later Orlov improvements comprised a covered tank above multiple plant growing columns, and a fluid pumping system configured and positioned to provide fluid to the tank, which then drew metered amounts of fluid from the tank and directed it to emitters positioned above the topmost growing pot. Later Orlov towers also had a centrally-located and vertically-extending rigid tube employed for stabilizing the growing pots, which was also used to transport water and nutrients to the overhead emitters. Since their inception, Orlov towers have been used in many different ways to grow a wide variety of fruits and vegetables. Limited success was experienced relating to "home sales", U-Pick Farms, and "Farm Stores", particularly for the growing of strawberries which use far less water and nutrients than do other fruits and vegetables. Five and more stacked pots were often employed for strawberry production. However, the high tower arrangement used hindered commercial success, as significantly decreased crop yields were obtained in the lower stacked containers. Furthermore, when Orlov towers were tested for growing crops that use more water than strawberries, it was found they could not compete in cost with field cultivation methods used by large farming operations.

In an attempt to achieve greater success for his stacked growing pots over that experienced by Orlov, the inventor herein experimented and eventually discovered that the Orlov growing pot was too small for some crops. Also, the Orlov drain holes (four holes each ⅛-inch in diameter) were found to be too small, and too few in number, becoming easily plugged by growing media (which explained the lower production/yield routinely experienced in the lower stacked Orlov containers). The small Orlov growing pot also limited the size of transplant that could be used for certain crops, which further contributed to poor yields. In his continued attempts to grow more plants in less space, with less water and less fertilizer, the inventor herein has made many changes in his stacked growing pots that have progressively improved tower crop/plant production and yield. His continued testing and improvements extended growing pot life for longer reuse, and new materials discovered for growing pot manufacture created cost savings by allowing center holes to be custom-drilled to match the size of center support pipe used with it, and for the first time tower plant/crop cultivation became commercially viable and competitive with common field cultivation. In 1996, the inventor herein made growing pot improvements that involved a change in pot size, a change in the number of drainage holes per pot, and a change in the way his growing pots were stacked. These changes alone made it easier to stack and rotate the growing pots during their use, which made tower cultivation more efficient.

Subsequently, the inventor herein created another improvement for his growing pots. To provide easy tower rotation without damage to the stacked growing pots, he placed a thick opaque plate made from high-density polyethylene (HOPE) under the bottom growing pot in each tower to allow all stacked pots to rotate together. His experimentation with tower rotation improved plant growth on all sides of the tower, and produced a corresponding increase in growing pot life. A bottom support plate and spacer assembly also kept the bottom stacked growing pot in a tower from sinking into the ground as plant mass in the growing pots increased, and further use of a centered bottom hole with a diameter dimension of slightly more than 1-inch in each growing pot located in outdoor growing applications, allowed a sturdy steel pipe to extend through all growing pots in a tower, and then be driven into the ground to help protect tower integrity against damage from strong winds, driving rain, and other shearing forces. This arrangement placed about 48-inches of conduit above ground for tower construction, and allowed for a maximum of five growing pots to be stacked on a 4-inch riser separated by two rotation plates.

More recently, the inventor herein implemented additional improvements, which have further augmented the commercial viability of his towers, allowing them to increase crop yields without an increase in acreage. Such improvements include a simple, fast, and easy way to change the number of growing containers used in each tower according to the types of crops/plants to be grown therein, while concurrently maintaining a substantially uniform tower height among neighboring towers in a row so that one overhead nutrient distribution system may be used (without modification) for all towers in the row, even if the number of growing containers in adjacent tower is different to facilitate the growth of differing types of plants/crops. In addition, present invention growing pots have a new design configured to improve drainage and reduce shipping damage, and a modification to tower rotation has been made to accommodate the new container design. Protective sleeves made from hard material are also now positioned around growing pots in outdoor commercial applications to extend their life for longer repeat use. Experimentation with ground pots at the base of towers having less than a full complement of stacked growing pots also ensued to determine what type of bonus plants/crops could be successfully produced, as well as attempts at varying nutrient distribution into the top growing container in each tower. Furthermore, since multiple reuse of the present invention growing pots is needed for commercial success of tower plant/crop production, experimentation took place to find growing pot materials that were lightweight, yet sufficiently hard and strong to withstand repeated high-pressure washing with sodium hypochlorite solutions (used to remove old growing media and sterilize pots), and also withstand dipping in cleaning and/or sanitizing solutions used to reduce the risk of plant disease without contaminating growing media.

In addition to growing pot structure and design, the height of present invention towers are important to its commercial success, and the structure revealed herein for the present invention reduces the capital cost associated with tower plant growth by approximately 35%. Since present invention tower place approximately three times as many plants in the same square footage when compared to crops produced by prior art tower/column planting systems, planting and harvest time in present invention towers is substantially reduced over the prior art. Furthermore, as all bottom growing pots are typically at least 10-to-20-inches above the ground, workers require less bending to accomplish their tasks, making planting and harvesting much easier. Also, as a result of this above-ground elevation, certain crops (i.e. cucumbers and melons) can be grown above-the-ground and produce fruit without ground contact, thus eliminating soil-borne contamination of leaves and fruit. The raised positioning also allows less damage from small animals when towers are used outdoors, or in open-sided greenhouses. Furthermore, when fruit produced in present invention towers needs ground support, it can be further protected by placement of commercial ground cover and weed control fabric under the towers, which can be painted white in hot climates to reduce ground heat that might otherwise adversely affect fruit quality. No other plant tower growing system or method is known that functions in the same manner as the present invention, or provides all of its advantages.

DISCLOSURE OF INVENTION

It is the primary object of this invention to provide a water-saving column planter arrangement that is commercially viable in large farming operations and can replace current in-ground field cultivation employed for strawberries, melons, lettuce, spinach, herbs, certain varieties of tomatoes, beans, cucumbers, squash, corn, peppers, and other selected food-producing plants and ornamentals. Another object of this invention is to provide a column/tower planter arrangement that allows for more crop versatility than is possible in previous tower planting systems, as well as more uniform plant growth, easier rotation of towers for light optimization, easier and faster planting/harvesting, easier filling of growing pots with growing media, and easier tower loading and unloading. A further object of this invention is to provide a column planter arrangement that allows extended tower height for more efficient use in greenhouses and high tunnels than has been possible in the prior art, and less damage from small animals when used outdoors and in open-sided greenhouses. It is also an object of this invention to provide a column planter arrangement the major components of which have durable construction, are easy to ship and store compactly, and are repeatedly reusable for five years or more. A further object of this invention is to provide a column planter arrangement that will allow more effective use of water/nutrients than is currently possible in the prior art, as well as better placement of nutrients in the root zone, less salt build-up around the base or crown of a plant, and less plugging of drain holes in the bottom of the growing pots with growing media. It is also an object of this invention to provide a column planter arrangement with smaller and more efficiently designed lower support plates than are currently used in the prior art, as well as tower swivel/rotation plates that do not overlap growing pot drain holes, have a black color to eliminate algae growth, and have a changed center hole size to fit a variety of support pipes with differing diameter dimensions. It is a further object of this invention to provide a column planter arrangement with improved growing pots having rounded corners on its upper edge/lip configured to prevent damage to plant stems overhanging them, with the new growing pot configuration strengthening them so they sustain less damage during stacking, shipping, and cleaning, for longer repeat use and reduced production cost. It is also an object of this invention to provide a column planter arrangement having hard plastic sleeves that protect growing pots from premature deterioration as a result of exposure to solar UV radiation, enhance the aesthetic and decorative appeal of growing pots in tower growing arrangements that are used in non-commercial applications, and also provide enhanced insulation value to growing pots due in part to their slightly oversized configuration and the air layer that becomes trapped between growing pot and sleeve. A further object of this invention is to provide a column planter arrangement that will allow easy assembly and easy change of tower height to accommodate the growth of differing types of plants in a tower, while maintaining the same overall tower height so as to require only one size and configuration of steel support column for all towers (reducing handling and inventory cost), as well as use of a single irrigation system without any modification when less that the maximum number of growing pots is present in any tower in a row. It is also an object of this invention to provide a column planter arrangement having an optional ground pot to collect excess nutrient drip from the growing pots above it, thereby allowing concurrent production of root crops that cannot be effectively grown in vertically stacked growing pots above it, or in the alternative collect and divert excess nutrient drip to remote locations for crop/plant cultivation, Aquaculture, and/or other use.

The present invention, when properly made and used, provides an improved tower planter growth arrangement competitive with in-ground field cultivation techniques for many crops and ornamental plants. Its growing pots are strong and reusable, 100% recyclable, and can be stacked one upon the other in locked array (preferably 2-to-12 pots), with the bottom corners of a next higher stacked growing pot off-set approximately 45-degrees from those of the stacked growing pot immediately below it, and further when in locked array each bottom corner engages a centered groove located in the top edges/lips of one of the four sides of next lower growing pot. Such positioning prevents an upper growing pots 4 from resting on (and compacting) the growing media in the next adjacent growing pot 4 below it. The number of stacked growing pots per tower is variable and selected according to the type of crops/plants grown, with the preferred number typically ranging between two and twelve. Should towers become too tall without a similar increase growing pot strength, towers are at risk for collapse as plat/crop mass grows. Present invention stacked growing pots are also anchored into their usable positions by a vertically-extending support pipe, which is may have a two-piece swaged construction that facilitates assembly of taller towers than previously has been possible in prior art columns/towers. A horizontally-extending nutrient distribution pipe may be secured to the top end of the vertically-extending support pipe in each present invention tower established in a crop/plant production row, with an emitter tube connected to the nutrient pipe allowing water/nutrient flow into a nutrient distribution pot positioned above the topmost stacked growing pot. The improved present invention growing pot design also helps to provide better placement of water/nutrients in the root zone (corners of the present invention growing pots), less salt build-up around the base or crown of a plant, and less plugging of growing pot drain holes with growing media (which blocks quick water/nutrient drip-to-excess flow through all growing pots in a tower). The use of more nutrient drip than is required by all of the plants in present invention towers ('drip-toexcess') must occur to give all plants/crops grown therein optimum nutrient availability for high yields. Thus, while nutrient overflow is typically expected, waste can also be minimized (as needed) by the use of timers and plant/crop monitoring. Nutrient overflow can optionally be used in growing bonus plants/crops in ground pots, or diverted away from present invention towers for other productive use.

A major advantage of the present invention over other prior art tower systems, and which allows it to become a competitive alternative to commonly used field crop production techniques, is that the number of growing pots can be easily varied to maximize yields at any time according to the type of plant/crop cultivated, as well as available light, without any modification of an overhead nutrient delivery system. When less than a full complement of stacked growing pots is used in a present invention tower, an approximately ¼-inch thick hexagon-shaped rotation plate made preferably from black high-density polyethylene (HDPE) is first placed under the bottom stacked growing pot. A spacer/riser is then placed around the portion of the tower's support pipe between the rotation plate and a ground pot (or between the rotation plate and a support plate and spacer assembly positioned at ground level, when no ground pot is employed). The length of the spacer/riser is selected to position the top stacked growing pot in the tower at substantially at the same height as the top growing pots in nearby towers using the same overhead irrigation system. Thus, crops in present invention towers can be changed, with a corresponding change in the number of stacked growing pots to maximize plant/crop growth (as needed), and the overhead nutrient delivery system can remain in place without modification, significantly reducing labor and material cost.

When a ground pot is used in a present invention tower, it is preferably a 2.5-to-5-gallon container with a slightly larger than 1-inch centered bottom hole, a minimum diameter dimension of about 10-to-12-inches, and optional side drainage holes near its bottom surface (according to need). Furthermore, although not shown, it can be used to grow the same plants/crops cultivated in the growing pots above it, or different plants/crops that do not grow well in stacked growing pots, such as root crops. For outdoor towers having a vertically-extending support pipe made from ¾-inch EMT conduit, about 10-to-15-inches of its bottom length is inserted below ground. In addition, approximately 16-to-24-inches of ½-inch EMT conduit is usually inserted into the ground within the support pipe as a ground stake, extending below the support pipe and providing an internal support for the tower both above-ground and below-ground. Alternatively, wooden, bamboo, plastic, and plastic materials can be substituted in present invention stakes.

Features and components of the present invention providing for easy tower assembly, include a two-part support pipe construction and rounded/beveled corners on the up stacking, shipping, and cleaning, and extend their useful life. Improved drainage hole size, placement, and number in present invention growing pots also contributes to increased plant/crop yields and commercial viability of present invention towers with field cultivation techniques. In addition, sleeves used with present invention growing pots to extend their life can be made decorative to increase sales in non-commercial applications. Riser use also promotes easy tower rotation without growing pots damage, since the bottom growing pot is typically elevated at least 12-inches above the ground where it is easily accessible. Also, present invention support plates and spacer assemblies prevent ground pots from sinking downwardly into the ground as leaf/fruit mass increases and stacked growing pots become filled with heavy crops. Furthermore, present invention improvements include use of irrigation systems with indoor towers. A good soil mixture, and many soil-less potting mixtures (such as but are not limited to compost, peanut hulls, rice hulls, and sand), may be used in present invention ground pots, with pure expanded coconut fiber providing adequate water/nutrient retention to sustain the growth of many roots crops. When used in largescale farming operations, present invention growing pots may be machine-filled by standard commercial horticultural pot-filling machines (with slight modifications).

Preferred present invention growing pots are also small to reduce the amount of growing media used, and are tapered to allow nesting for efficient handling/packing/shipping, over 9-inches square at the top, and as small as approximately 6.3-inches square at the bottom, providing space for approximately four liters of growing media (although not limited thereto). Improved drainage is provided by eight drain holes placed strategically through its bottom surface in a generally hexagonal configuration, with emphasis on corner drainage from one growing pot to the next growing pot below that efficiently, economically, and quickly moves water/nutrient downwardly from a top growing pot to the next growing pot below it, and so on. Each present invention growing pot also has wall and bottom thickness dimensions of approximately ¾-inch (for increased strength, reduced breakage, reduced root penetration, and enhanced insulation value), and is made from high-density fused expanded polystyrene (HDEPS) for lightweight but strong construction, all at a low cost. Also, HDEPS materials are non-toxic to plants and humans, and have no harmful fumes. A minimum material density of approximately 2.7 pounds per cubic foot is also preferred to allow each present invention growing pot to provide good insulation and hold up well under the weight of growing media, which often weighs 5-6 pounds per container when saturated with water/nutrient. Many other plastics are higher in cost, and do not insulate plant roots or otherwise promote their growth. Also, the internal walls of present invention growing pots must be sufficiently smooth to prevent root penetration, which if breached would defeat the purpose of an insulated growing pot. Furthermore, when common in-ground farming is used, the plant density expected for strawberries is about 17,000 to 18,000 plants per acre in Florida, and as low as 12,000 plants per acre in other more northern areas. In contrast, the present invention tower system allows for a plant density of 48,000-54,000 plants per acre, more than double that of common in-ground field cultivation. In addition, water use for present invention towers is approximately one-twelfth over that needed for the standard field production of strawberries grown in Florida, an approximate 83% savings. Also, excessive rain which can be a problem in the field production of strawberries, does not pose a problem for strawberries grown in present invention towers, since plants do not touch soil and crop contamination by soil-borne diseases and bacteria that can cause sickness or death in humans is eliminated, which can be present in field cultivation as a result of contaminated soil, contaminated ditch irrigation water, run off water from an adjacent field, and/or run off water from contaminated reservoirs, rivers, ponds, and lakes. Present invention growing pots can be placed in rows that allow sufficient spacing for optimum plant growth, with tower spacing frequently 24-inches when multiple rows of towers are present, and perhaps only 4-inches apart down a singular row for certain crops/plants. When growing pots in adjacent rows have a staggered arrangement, preferred tower spacing can be reduced to approximately 18-to-30-inches down a double row. Tower supports may include stakes driven into the ground at least 10-to-12-inches to give the towers strength in high winds, and may include EMT conduit, bamboo stakes, wooden stakes, and even plastic pipe in certain applications.

In summary, present invention towers for strawberries, cucumbers, peppers, beans, and certain other vegetables and melons, as well as for certain horticultural crops, have many advantages over common field cultivation techniques, as well as other hydroponic, soil-less, and/or organic growing systems. Cost in the present invention has been significantly reduced over other column/tower planters, allowing competitive commercial production for many crops/plants. Also, because no soil is required, present invention towers can be used anywhere in the world, with growing media derived from a diverse variety of local agricultural by-products found worldwide, such as but not limited to, coconut fiber or coir, peanut hulls, rice hulls, composted bark, perlite, and the like. Water savings, energy savings, and space savings are all increasingly important to horticulture and agriculture worldwide, and the present invention tower plant growing arrangement provides advantages in each area. Although high-density expanded polystyrene (HDEPS) is the preferred material for present invention growing pots, which can be manufactured under strict design and quality specifications to increase food production worldwide, and can be custom-drilled to match the diameter dimension of its associated support pipe, other raw materials may also be used as a part of the present invention to produce a similar configuration of growing pot that will stack, insulate, rotate, drain, accept modification, and otherwise operate in the same or similar fashion. The height of present invention towers is a key factor in making its vertical high-density cropping system commercially successful, by reducing capital costs approximately 35%. Planting and harvest times are also reduced by present invention use because there are approximately three times as many plants in the same reachable area, and they are usually at least 10-to-20-inches off the ground, which reduces the bending that would otherwise slow planting and harvesting activity. The present invention also allows certain crops (such as cucumbers and melons) to be grown above ground without the use of soil, and when fruit touches the ground, it can be protected by a commercial ground cover or weed control fabric, which can also be painted white in hot climates to reduce a heat source that could otherwise adversely affect the quality of fruits grown on the ground.

It must be noted that the description herein provides preferred embodiments of the present invention but should not be construed as limiting its scope. For example, variations in the number of growing pots used in each tower; whether sleeves are used to provide additional insulation or decoration to growing pots; whether a ground pot or support pot is used below the bottom stacked growing pot; whether a fertilizer distribution pot is used above the topmost growing pot; whether an internal stake is used for additional belowground tower support, other than those shown and described herein, may be incorporated into the present invention. Thus, the scope of the present invention should be determined by the appended claims and their legal equivalents, rather than being limited to the examples given.

BRIEF DESCRIPTION OF THE DRAWINGS

FIG. 7 is a side view of a preferred two-piece swaged support pipe usable with preferred present invention towers to augment their height.

FIG. 8 is a bottom view of a preferred present invention growing pot having an octagonal bottom drainage hole array that encourages optimal root growth within each growing pot in a present invention tower, the stackable growing pot also having an enlarged central bottom hole used for insertion of the vertically-extending support pipe therethrough, with broken lines showing preferred rotation plate positioning that does not block drainage holes.

FIG. 9 is a top view of a preferred rotation plate usable in present invention towers and made from black material that reduces algae growth and premature degradation due to solar UV radiation exposure in outdoor applications.

FIG. 10 is a side view of a preferred support plate and spacer assembly usable in present invention towers in association with a central support.

COMPONENT LIST

Figure 1:
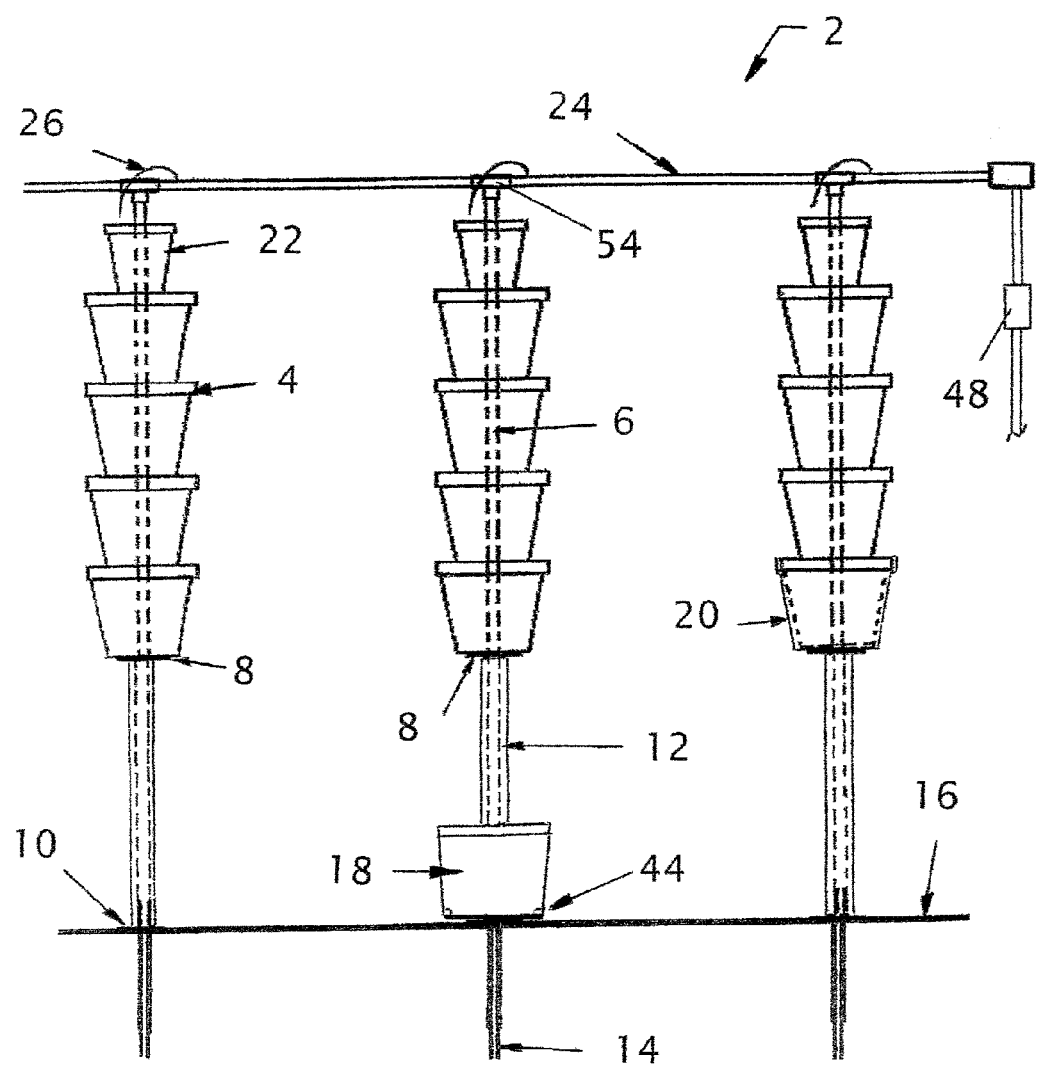
FIG. 1 is a front view of a first preferred embodiment of a present invention tower planter growth arrangement having several towers each comprising the same number of stacked growing pots associated with a vertically-extending support pipe that extends below ground, a stake within the lower end of the support pipe positioned both above and below ground, a horizontally-extending nutrient distribution line secured to the top of each support pipe, a small fertilizer distribution pot situated above the top growing pot in each tower, a drip emitter assembly extending from the nutrient line and positioned to discharge water/nutrient into the fertilizer distribution pot of an associated tower at predetermined time intervals selected according to plant type and growth stage, a rotation plate positioned under the bottom stacked growing pot that allows all stacked pots in locked array to rotate together, a riser under each rotation plate, a ground pot associated with one tower, a spacer plate at ground level in the two towers not having a ground pot, a sleeve over the bottom stacked growing pot in the rightmost tower (typically covering all growing pots in commercial outdoor applications), and ground cover positioned under all towers to protect fruit from ground damage and soil-borne contamination.

2—Tower Planter Growth Arrangement (also "tower" or "towers")
4—Growing Pot (¾-inch thick, high-density fused expanded polystyrene (HDEPS) foam material is preferred for lightweight but strong construction)
6—Support Pipe (can be either EMT conduit, or EMT conduit with a PVC outer layer)
6a—Swaged Top of Support Pipe 6 (for two-part assemblies used in high Towers 2)
6b—Non-Swaged Bottom of Support Pipe 6 (for two-part assemblies used in high Towers 2)
8—Rotation Plate (allows rotation of all Growing Pots 4 in locked array at once)
10—Support Plate and Spacer Assembly (usable in place of Ground pot 18)
12—Riser (length varies according to the number of stacked Growing Pots 4 present to establish uniform height in adjacent towers and raise crops/plants at least 10-to-12-inches above the ground/floor for various advantages)
14—Internal Support/Stake (used above and below ground within Support Pipe 6 for added tower stabilization and strength)
16—Ground Cover (reduces risk of plant/crop contamination from soil-borne disease, and also reduces heat that could adversely affect fruit quality)
18—Ground Pot (captures excess water/nutrient drip from stacked Growing Pots 4, and may be used to divert collected water/nutrient to remote sites for other use)
20—Protective Sleeve (surrounds a Growing Pot 4 to substantially cover its sides and protect it from solar UV radiation, enhance its insulation value, and/or add decorative enhancement)
22—Nutrient Distribution Pot (can be approximately 5-to-6-inches in diameter)
24—Nutrient Distribution Pipe (preferably polypropylene and positioned above Growing Pots 4, can be optionally secured to the upper part of Top Support Pipe 6a)
26—Drip Emitter (connected to Nutrient Pipe 24 above stacked Growing Pots 4)
28—Swaged Connection (used with 2-part Tower Supports 6a and 6b to facilitate Tower 2 assembly and reduce shipping cost)
30—Support Plate (usable as a part of Assembly 10)
32—Bottom Drainage Hole (used in Growing Pot 14)
34—Center Opening (used in Growing Pots 4 and Rotation Plates 8 for Support Pipe 6 insertion)
36—Inside Ledge (made by Side Indentation 40, structurally strengthens Growing Pots 4)
38—Tapered Groove (triangular-tapered notch cut centrally into the upper edge/lip on each side of a Growing Pot 4, which is configured with Extension 46 to lock adjacent Growing Pots 4 in stacked array both with and without a Sleeve 20)
40—Side Indentation (structurally strengthens Growing Pots 4 and assists seedling growth in the next lower Growing Pot 4)
42—Rounded/Beveled Upper Edge (used in Growing Pots 4 to enhance pot strength and reduce stem breakage in certain crops/plants))
44—Side Drainage Hole (optional in Ground Pots 18)
46—Groove Extension (new, for enhanced locking connection of stacked Growing Pots 4 both with and without a Sleeve 20)
48—Timer (used for automated activation of water/nutrient flow from Drip Emitter 26)
50—Emitter Holder (preferably tubular and made from 1-inch by 3-inch black polyethylene)
52—Weighted Filler (can be used in Ground Pot 18 to provide enhanced Tower 2 support in place of growing media used for the production of bonus plants)
54—T-fitting (connects Nutrient Distribution Pipe 24 to Support Pipe 6)

BEST MODES FOR CARRYING OUT THE INVENTION

The present invention provides a new design for growing pots 4 used in vertically-extending tower growth assemblies 2 (also referred to herein as towers 2), as well as a new and versatile vertical stacking arrangement for growing pots 4 into towers 2 that maximizes crop production while keeping costs at a sufficiently reduced level to make it commercially viable with in-ground farming techniques for growing a wide variety of plants and crops (not shown). Improvements in commercial applications (that result from changes to growing pots 4, rotation plates 8, and support pipes 6) allow present invention towers 2 to be constructed about 15-inches taller than prior art columns, which increases yields in the production of some plant/crop to levels that make tower 2 use a financially competitive alternative. However, in the production of certain crops, such as strawberries, yields increase with the use of low towers, which may have only three stacked growing pots 4. In addition, smaller scale present invention towers 2 can also be successfully employed by families for home use, and in other applications such as but not limited to U-Pick Farms, and "Farm Stores". High towers 2 are not typically used in U-Pick Farm applications. Improved present invention towers 2 using the same overhead irrigation line 24 (see FIG. 1), all maintain approximately the same maximum height (regardless of the number of stacked growing pots 4) through the use of variable length of spacers/risers 12 preferably made from polyvinyl chloride (PVC) plastic, but not limited thereto. Risers 12 are placed around the centrally positioned and vertically extending support pipe 6 in ted between the bottom growing pot 4 in many towers 2 and the ground surface (under ground cover 16), and they raise the bottom growing pot 4 in most applications to approximately 10-inches to 20-inches above the ground (see FIG. 1). Risers 12 allow the growth areas (see C-G in FIG. 3) in each tower 2 used to be increased or decreased to that most favorable according to the type of plant/crop to be grown, and also space apart growing pots 4 for larger plants to prevent overshadowing of vegetation in lower growing pots 4 (See FIG. 18 where two rotation plates 8 and one riser 12 are positioned between each adjacent pair of pots 4 or 18). Rotation plates 8 are preferably opaque/black, approximately 3.25-inches tong and wide, approximately ⅝-inch thick, made from high density polyethylene (HDPE), and typically placed between the bottom of a growing pot 4 and a riser 12, providing ease of rotation without damage to growing pot 4 (or any growing pots 4 above it in locked array). Tower 2 rotation is needed for financially competitive plant/crop production, as it allows plants on all sides of towers 2 receive adequate sun and shade, according to their needs and the local climate. Tower 2 rotation also extends the life of growing pots 4, as one side thereof is not always facing the sun and experiencing accelerated deterioration as a result of more exposure to solar UV radiation. Rotation plates 4 and support plates and spacer assemblies 10 (see FIGS. 1 and 10) can also prevent growing pots 4 from sinking into the ground as leaf/fruit mass increases and the weight of each growing pot 4 grows as it becomes filled with heavy plants/crops. The use of a riser 12 allows the heights of each tower 2 in a row to become a standard dimension above ground (preferably but not limited to) 66-to-68-inches for many crops/plants, with the number of stacked growing pots 4 therein typically ranging from two to twelve. For example, strawberries do well with three stacked growing pots 4 per tower 2, while tomatoes, and peppers may be successfully and competitively grown using five or more stacked growing pots 4).

Center support pipe 6 strengthens and stabilizes a present invention tower 2, and makes their installation and disassembly much easier. In high towers 2 (having more than five growing pots 4), at least 10-to-30-inches of vertical height has been added to each tower 2 (over prior art systems), enough room for another growing pot 4 (sometimes an important factor in raising crop/plant yields to the level needed for commercial success). In addition, to provide commercially viable farming operation using towers 2, the growing pots 4 used must have design criteria providing them with a life expectancy of at least 5 years. Commercial success of towers 2 has also been enhanced by the addition of ground pots 18 to towers 2 that can be optionally positioned under its bottom stacked growing pot 4, typically when six or less growing pots 4 are present, or between rows of towers 2 (so that no increase in acreage is used to grow the bonus plants/crops they provide. Ground pots 18 can be sized and configured to collect excess water/nutrient drip from the bottom growing pot 4 just above it, or in the alternative direct/divert collected fluid to a remote location for plant growth or other use (i.e. Aquaculture). Excess nutrient drip reaching ground pot 18 typically varies in composition from the nutrient fed into the topmost stacked growing pot 4 in a tower 2, but can often be used to grow bonus crops/plants without additional nutritional supplement, such as but not limited to root crops. Ground pots 18 are also good for growing plants that take up too much room in stacked growing pots 4 and cannot be successfully grown in the elevated stacked growing pots 4 located above ground pot 18, including but not limited to a variety of low light plants, flowers, eggplant, carrots, cauliflower, beans, radishes, potatoes, onions, peanuts, and cabbage. Pure expanded coconut fiber has good water retention and is often preferred in ground pots 18 for root crop production, as one brick thereof will fill about seven 2½-to-3-gallon ground pots 18. Also, use of commonly available high-density rubberized nursery pots that typically last a very long time, at least as long as growing pots 4, assists in making ground pots 18 a low cost option. Ground pots 18 may vary in size from 1-to-5-gallons, with preferred sizes having a volume of 2.5-to-5-gallons and a minimum diameter dimension of about 10-to-12-inches. Even though present invention towers 2 save at least 80-85% in water usage over standard field practices for production of the same crops/plants, the use of drip-to-excess nutrient application is still required to insure that plants/crops in all growing pots 4 in each tower 2 are fed the same, which leaves some water/nutrient left over. A timer 48 and plant/crop monitoring can beneficially reduce excess water/nutrient drip from each tower 2 to less than one quart per day for many crop/plants. This excess water/nutrient can be used in a ground pot 18 to grow bonus plants, or be diverted to other applications. In the alternative to the use of expanded coconut fiber mentioned above, the growing media used in ground pots 18 can include standard and proprietary pre-mixed soils, or a variety of soil-less potting mixtures, such as but are not limited to, composted coconut coir, other compost, peat moss, peat-perlite mixes, peanut hulls, rice hulls, and sand. Similar to the selection of growing media for present invention growing pots 4, choosing a growing media for ground pots 18 must take into consideration the water retention factor and the aeration/porosity provided by the growing media, and compare that to the water retention and aeration/porosity considered ideal for the plants/crops to be grown.

Figure 6:
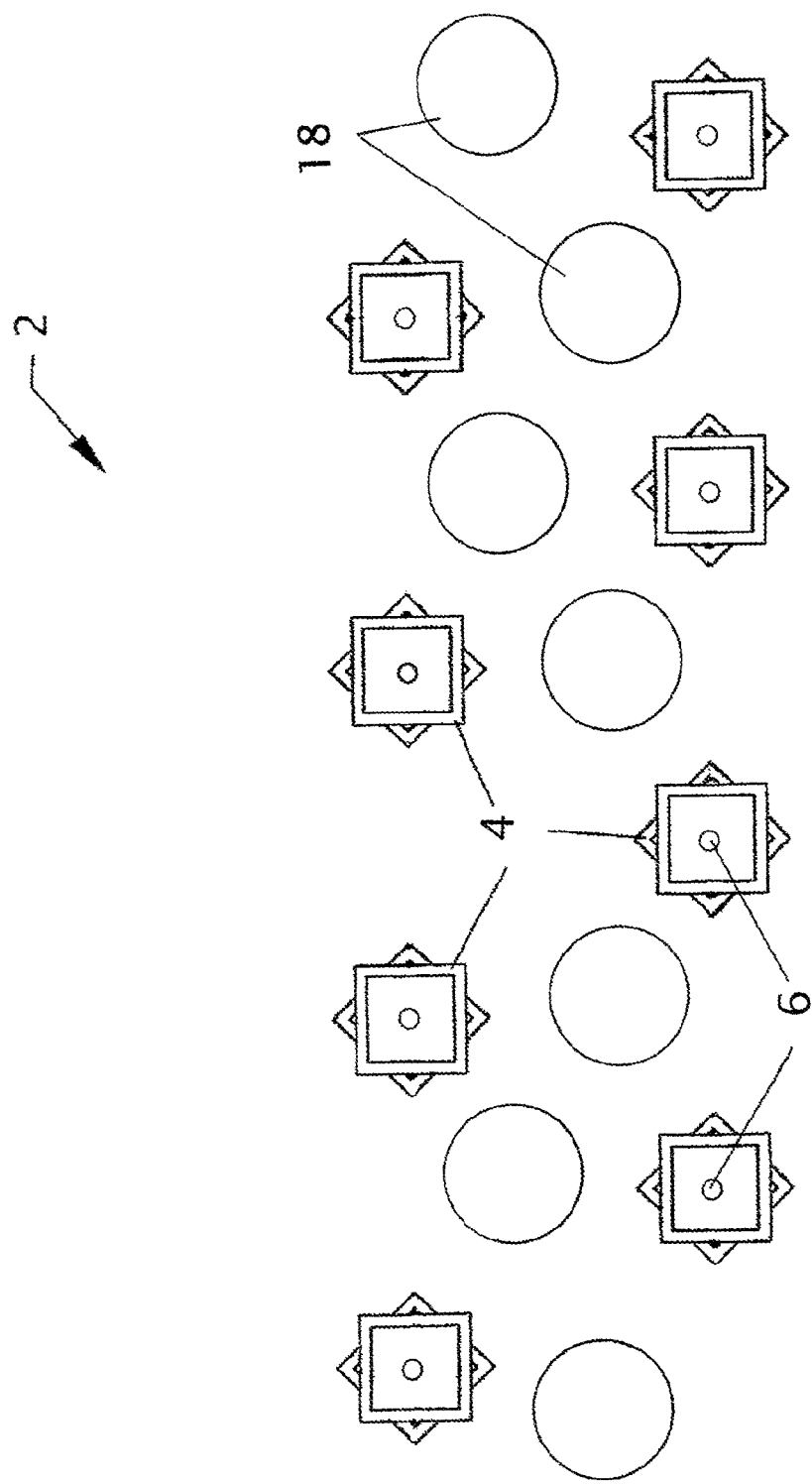
FIG. 6 is a top view of several preferred present invention towers in a staggered row arrangement typical for field cultivation of plants/crops, with the addition of ground pots between rows to increase plant/crop yields without a corresponding acreage increase.

The present invention has several preferred tower 2 arrangements to provide optimal growth of differing crops/plants, some started by seed, and other via the use of seedlings. Strawberries, melons, and certain vegetables, are commercially successful in low towers 2 each having three stacked growing pots 4 wherein a plant density can be as high as 48,000-54,000 plants per acre, as compared to a maximum expected density of about 17,000 to 18,000 plants per acre for strawberries grown in soil. Furthermore, the water used in tower 2 plant growth is approximately one-twelfth of that typically experienced in soil cultivation, an approximate 83% savings. Also, excessive rain does pose not a problem for present invention towers 2, since the plants/crops grown in them do not touch the soil, and plant/crop contamination from sources such as soil, ditch irrigation water, run-off from other fields, and overflowing reservoirs, rivers, ponds, and lakes are also typically avoided unless of catastrophic proportion, which routinely averts soil-borne disease and bacteria that cause sickness and/or death in humans (such as that reported not too long ago in the United States as a result of contaminated field-grown lettuce). Growing pots 4 in most towers 2 (high and low) are placed in rows with spacing between towers 2 sufficient to provide needed growth room and sunlight required by each type of plant/crop grown, with tower 2 spacing preferably ranging from 24-to-48-inches down a single row, and 18-to-30-inches down a double staggered row (see FIG. 6). As also seen in FIG. 6, ground pots 18 can be positioned between rows to increase yields or diversify crop/plant production. The EMT conduit (also referred to as support pipes 6, 6*a*, and 6*b*) that is preferably used in present invention towers 2 (with and without an outer jacket made of PVC plastic) can be driven into the ground approximately 10-to-12-inches when up to three growing pots 4 are used in a tower 2, to give towers 2 strength against damage from strong high winds. Stakes 14 can also be used within support pipes 6 (both above and below ground level) for added tower 2 stability in both high and low towers 2. Strawberries, lettuce, herbs, spinach and other small plants are grown with four plants per growing pot 4, and three-growing pots 4 per tower 2, for a total of twelve plants per tower 2 and a plant density of twelve plants per square foot (although this does not consider the aisle space needed for planting and harvesting when more than one row of towers 2 are present). Growing pots 4 are filled with growing media (not shown) to the top of their ledge 36 (see FIG. 12), then compressed slightly with at least one seedling (not shown) planted in each corner of growing pot 4 using a special tool (not shown). Direct seeding in the corners of growing pots 4 is also possible with fast-germinating seeds such as beans, cucumbers, squash, corn, and the like. In large-scale farming operations using towers 2, growing pots 4 may be machine filled by using a standard commercial horticultural pot-filling machine (with slight modifications). The growing media in growing pots 4 can be standard or proprietary pre-mixed soils, such as but not limited to, peat moss or peat-perlite mixes, or composted coconut coir, and is chosen by considering the water retention factor and aeration (porosity) it can provide. With wider row spacing, low towers 2 can be arranged in rows to fit standard irrigation systems already in place by commercial farmers. For use as a comparison, field-grown strawberries use raised beds with rows on 4-foot centers, with the plants fed using a drip line underneath a black or white plastic ground cover, and the nutrient laden water is dripped slowly to feed the entire plant root, which could take up a space of one square foot. In contrast, present invention low towers 2 typically utilize overhead drip irrigation, with each tower 2 preferably fed via one 4-gallon-per-hour emitter/dripper 26. In this manner, nutrients are first fed into the top stacked growing pot 4, then to the second growing pot 4, and the third, thereby feeding twelve plants with the same amount of nutrients and water provided to one field-grown plant. Thus, the use of present invention low towers 2 for strawberries, certain vegetables and melons, as well as certain horticultural crops, requires significantly diminished water/nutrient use. Also, since no soil is required, it can be employed anywhere in the world with growing media derived from local agricultural by-products, such as but not limited to, coconut fiber or coir, peanut hulls, rice hulls, composted bark, perlite, and the like. The saving of water, energy, and space, as well as reduced contamination from soil-borne disease, provided by present invention towers 2 are all important advantages to horticulture and agriculture worldwide. The high-density expanded polystyrene (HDEPS) material preferred for present invention growing pot 4 manufacture can be precisely formed to strict specifications of design and quality to fulfill a need to increase food production worldwide. However, although HDEPS material is preferred, growing pots 4 can be made from other materials that will stack, insulate, rotate, drain and operate in the same fashion so as to achieve commercial/financial success. Improvements in present invention towers 2 disclosed herein reduce the capital cost attributable to other high density cropping systems by approximately 35%. Also, planting/harvest times are reduced with present invention tower 2 use, as approximately three times as many plants are concentrated in growing areas (C-G, see FIG. 3) that are positioned at least 10-to-20-inches off the ground. Certain crops (such as but not limited to cucumbers and melons) can be grown above ground and produce fruit that will rest on the ground, with fruit on the ground protected by a commercial ground cover or weed control fabric 16, which can be painted white in hot climates to reduce the heat that might otherwise adversely affects fruit quality.

Figure 2:
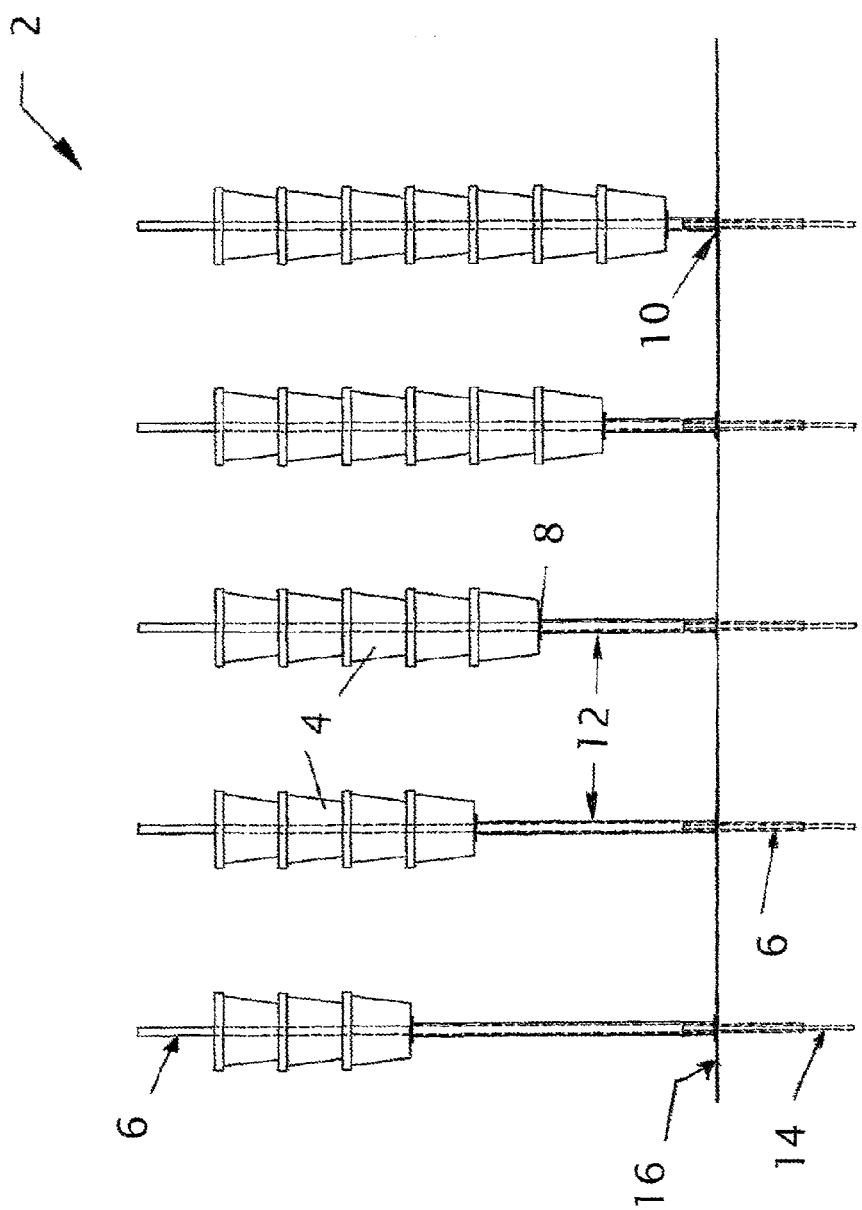
FIG. 2 is a side view of a second preferred embodiment of the present invention having towers in a row, with risers of differing length providing uniform tower heights while concurrently establishing different plant densities selected according to plant/crop type and the available light they will receive when fully grown, with towers also having stability enhancing stakes extending above and below ground within each support pipe (that is preferred in outdoor applications).
Figure 3:
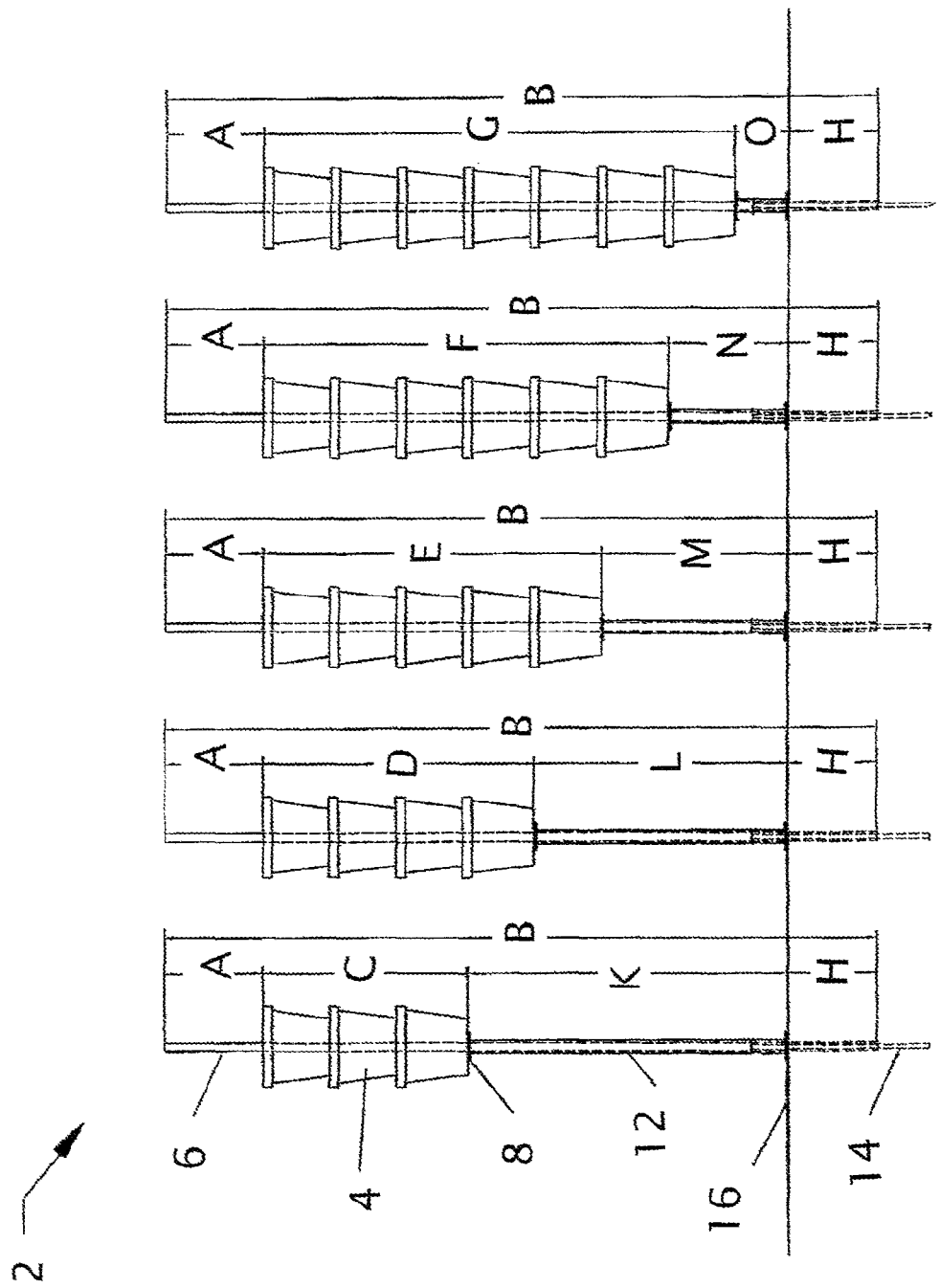
FIG. 3 is a side view of adjacent present invention towers similar to that shown in FIG. 2, with alphabet markings provided for dimensional comparison.
Figure 5:
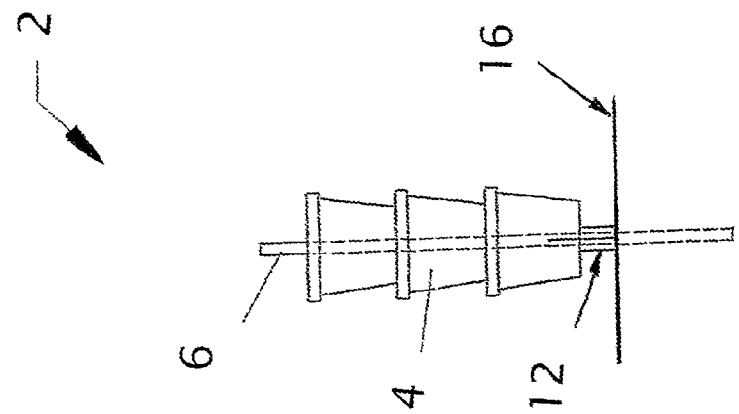
FIG. 5 is a side view of a fourth preferred present invention tower with a small riser providing a low tower configuration suitable for commercial strawberry cultivation.
Figure 11:
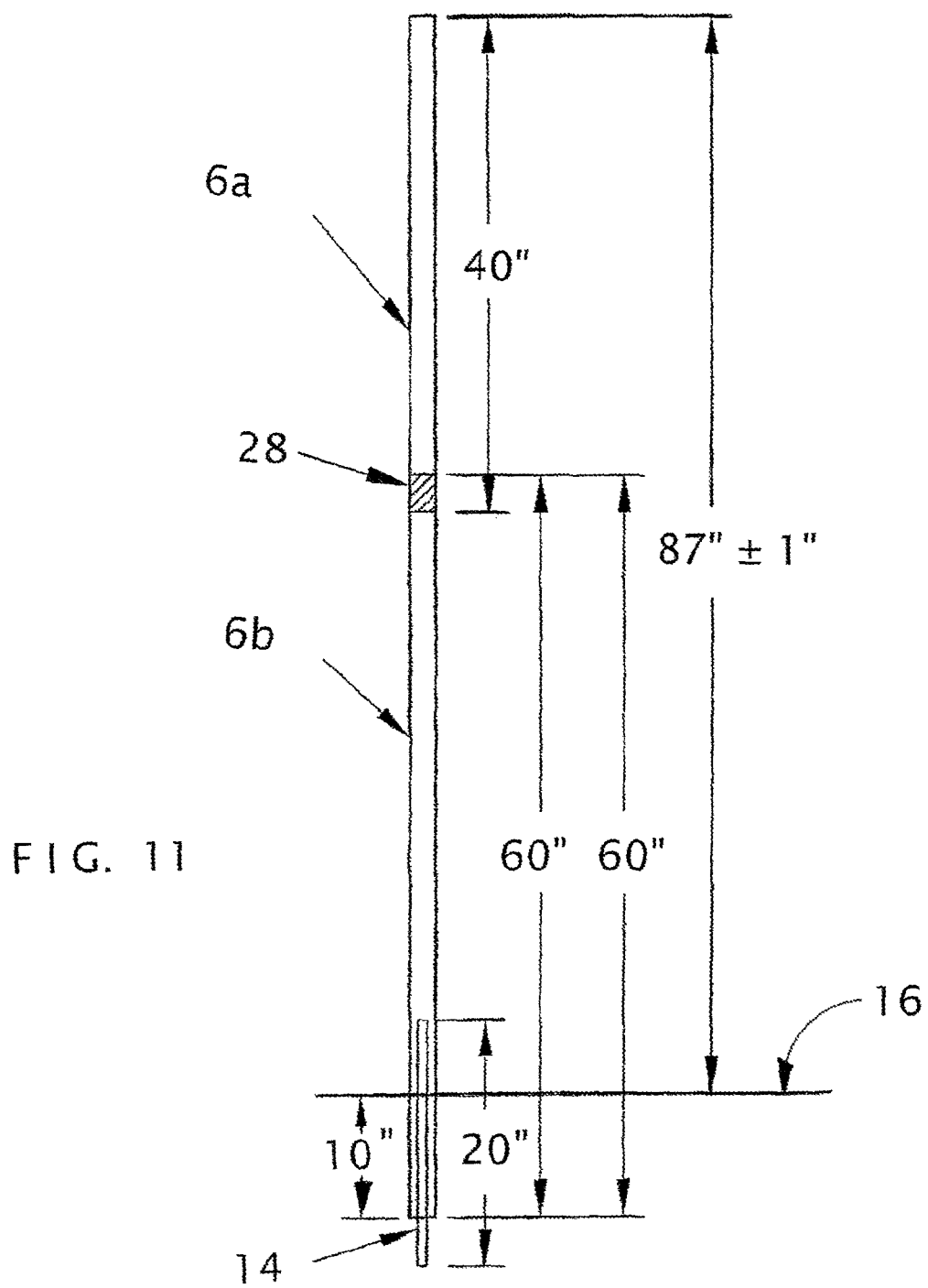
FIG. 11 is a side view of a preferred 2-piece swaged support pipe usable to enhance present invention tower height, and reduce shipping cost, with preferred above and below ground dimensions indicated.
Figure 16:
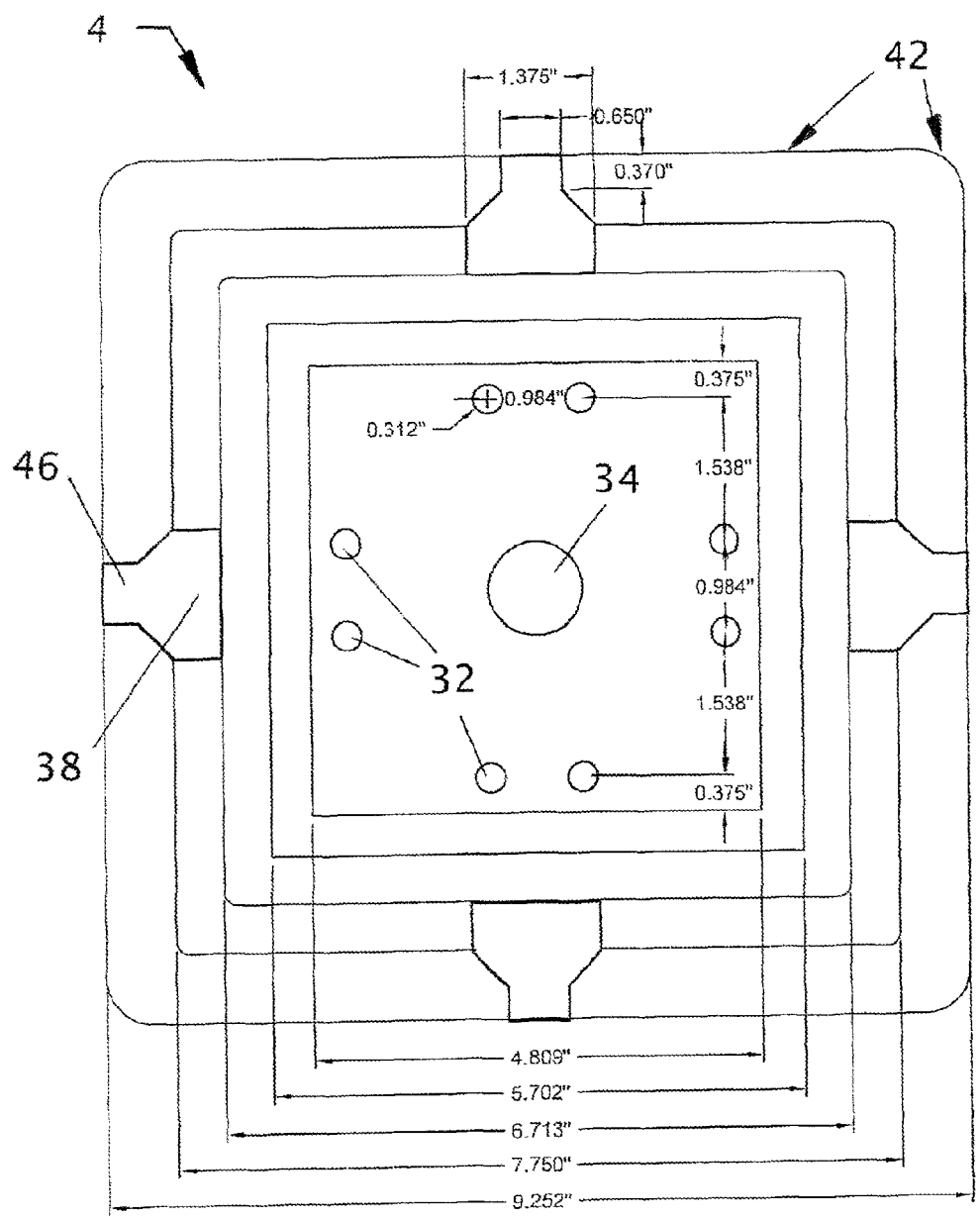
FIG. 16 is a top interior view of the most preferred present invention growing pot, with numerical markings provided for dimensional comparison.
Figure 17:
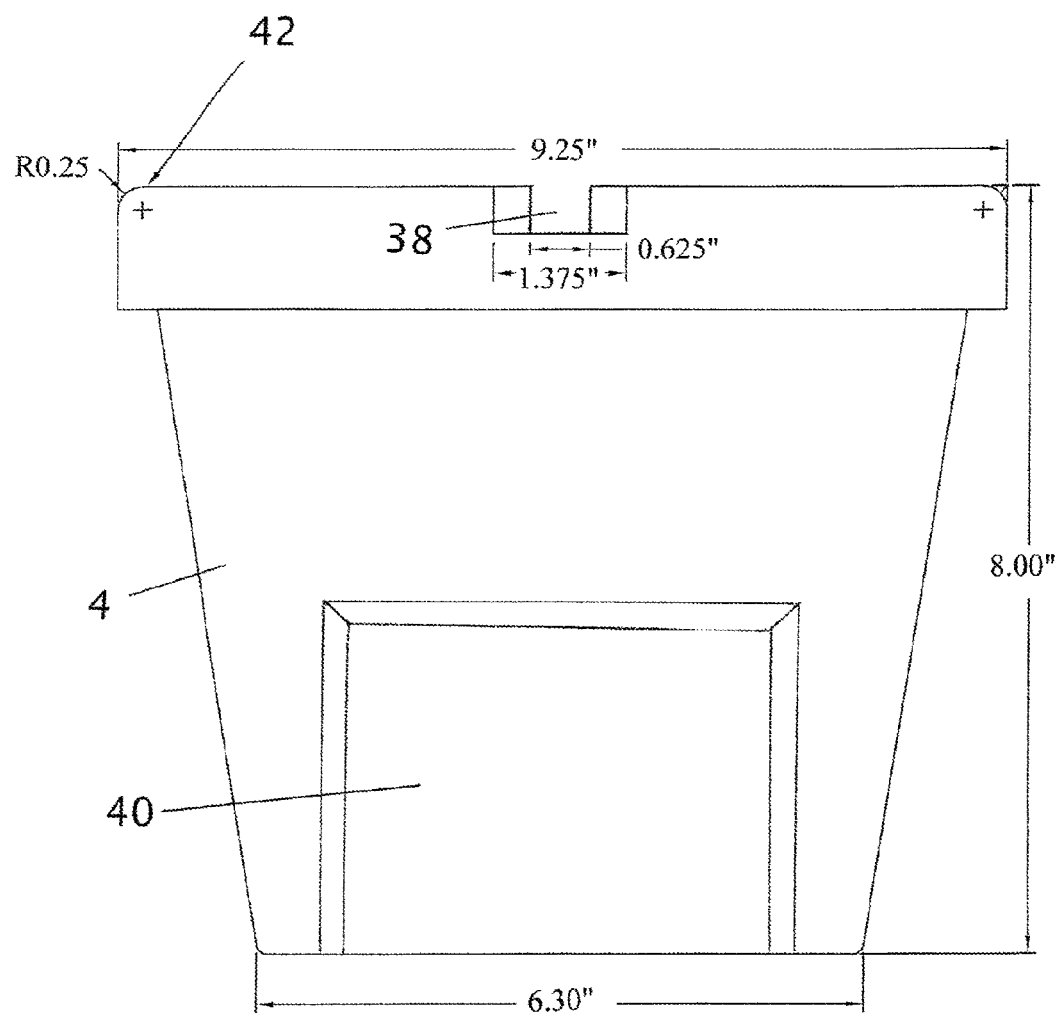
FIG. 17 is a side view of the most preferred present invention growing pot, with numerical markings provided for dimensional comparison.
Figure 18:
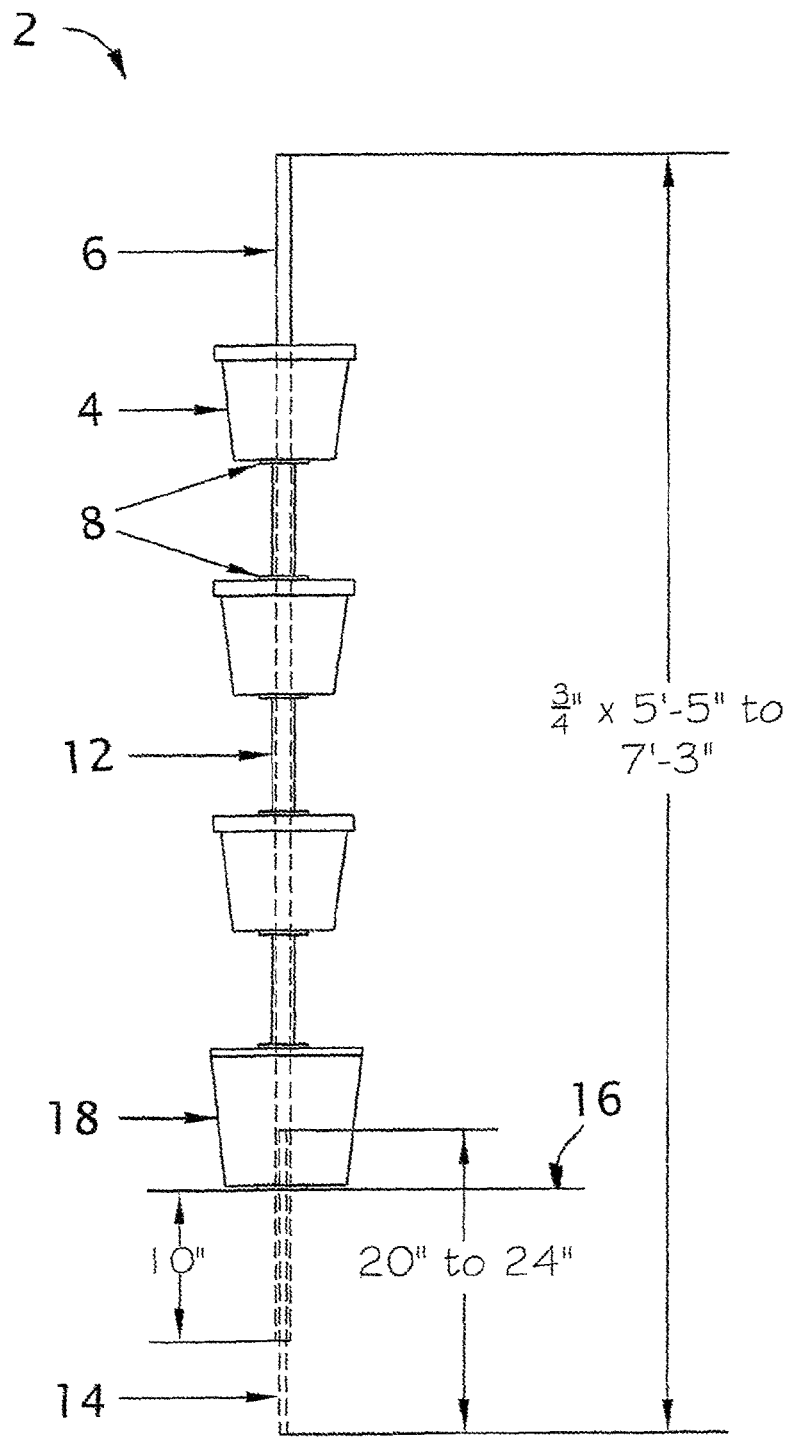
FIG. 18 is a side view of a present invention tower preferred for stacked growth of large plants, with two rotation plates and a riser between each pair of adjacent growing pots, to space growing pots further apart to reduce plant shading that would otherwise reduce plant/crop yields, and numerical markings provided for dimensional comparison.

FIGS. 1-3 each show a row of adjacent towers 2, with FIG. 1 further showing the preferred positioning of a ground pot 18 at the base of one tower 2, nutrient distribution pot 22, a ½-inch diameter nutrient pipe 24 connected to a ⅛-inch diameter drip emitter assembly 26 targeted for delivering water/nutrient to each stacked array of growing pots 4, and a polystyrene hard protective sleeve 20 that can also provide additional insulation to growing pots 4, decorative enhancement, as well as protection from solar UV radiation in outdoor applications. Also in FIG. 1, support pipes 6 are ¾-inch diameter EMT conduit (or a ¾-inch PVC sleeve over a ½-inch diameter EMT conduit), risers are 1-inch PVC plastic, ground pots 18 have a 2.5-to-5-gallon capacity and a 1-inch center hole, and the EMT conduit of support pipes 6 are inserted into the ground about 10-to-15-inches, with internal stake 14 having a diameter dimension of about ½-inch and a length dimension of about 16-to-24-inches. FIG. 2 shows towers 2 that can be of varying height and made from 10-foot lengths of EMT conduit, while FIG. 3 shows comparative dimensions for towers 2 components. In addition, FIGS. 4 and 5 each show a tower 2 intended for individual use (not competing with in-ground farming), with the tower 2 in FIG. 4 having an optionally weighted ground pot 18 and the tower 2 in FIG. 5 shown having a low tower configuration and its tower support 6 inserted into the ground. In contrast, FIG. 6 shows a staggered arrangement of towers 2 preferably used when two or more rows of towers 2 is employed, with ground pots 18 also positioned between rows to increase yields without an increase in acreage, while FIG. 7 shows a tower support 6 having a two-piece swaged construction so that it can be separated into two pieces for more efficient shipping and installation. Also, FIG. 8 shows the preferred arrangement of drainage holes 32 in a growing pot 4 and its center hole 34 that is used for the insertion of tower support 6 through growing pot 4, while FIG. 9 shows a rotation plate 8 having a hexagonal perimeter configuration that accommodates the new arrangement of drainage holes 32 in growing pot 4, and FIG. 10 shows a preferred embodiment of optional support plate and spacer assembly 10 that is usable with present invention towers 2 and its disk 30 used at ground level to prevent growing pots 4 from sinking into the ground as plant/crop weight increases. Furthermore, FIG. 11 shows a 2-piece swaged support pipe 6 usable in present invention high tower 2 assemblies with preferred dimensions indicated, while FIGS. 12-15 show detailed views of the most preferred embodiment of growing pots 4, including the enlarged groove 38 with an extension 46 that allows locking growing pot 4 arrays with and without a sleeve 20, new drain hole size, and FIGS. 14 and 15 also showing stacking sequence for growing pots 4, strength-enhancing features 40 and 36, aligned center holes 34, and drain holes 32 positioned near the corner area in the next growing pot 4 below where growing plants need optimal water/nutrient availability. Lastly, FIGS. 16 and 17 show the most preferred present invention growing pot 4 with numerical markings provided for dimensional comparison to prior art growing containers (not shown), while FIG. 18 shows a present invention high tower 2 preferred for elevated growth of large plants, with two rotation plates and a riser between each pair of adjacent growing pots 4 to space them apart to allow adequate room for plant growth as well as to prevent shading of lower plants by those in higher growing pots that would reduce yields, with FIG. 18 also providing numerical markings for dimensional comparison.

FIGS. 1-3 each show a row of present invention towers 2. FIG. 1 shows three towers 2 each formed from four stacked growing pots 4 and one top nutrient distribution pot 22. A different vertically extending support pipe 6 (shown by broken lines) centrally extends through each grouping of stacked growing pots 4, which is manufactured and positioned to stabilize and strengthen towers 2, and it also extends through nutrient distribution pot 22 which can be used to produce fast growing plants. A tubular riser 12 is also positioned under the bottom growing pot 4 and around support pipe 6. FIG. 1 also shows an internal support/stake 14 that strengthens support pipe 6 at ground level from possible damage as a result of shearing forces (i.e. wind and others), and stake 14 extends both above and below ground level within support pipe 6, as well as a small distance below support pipe 6. FIG. 1 further shows a nutrient pipe 24 extending above each tower 2 and connected to the top of each support pipe 6 with a T-fitting 54 (preferably made from polyvinyl chloride material), and a different drip emitter assembly 26 extending downwardly from nutrient pipe 24 to a position just above each nutrient distribution pot 22 for discharge of water/nutrient solution (not shown) into the nutrient distribution pot 22 immediately below it. Connection of nutrient pipe 24 to support pipes 6 avoids the need for an overhead frame to suspend nutrient pipe 24. Also, although not shown, the T-fitting 54 that connects nutrient pipe 4 to support pipe 6 may have a hole drilled in it at an angle that allows it to firmly secured with a fastener to support pipe 6, yet also allows easy removal from support pipe 6 for easy replacement of one nutrient distribution pot 22 for another as the fast growing plants in them (such as but not limited to herbs) become full grown and ready for sale. Such nutrient distribution pot 22 replacement may occur multiple times during the production of plants and crops in the growing pots 4 associated with the same tower 2. A simplistic representation of a timer 48 is also shown in association with nutrient pipe 24, which is used for automated activation of water/nutrient drip through emitters 26 into each nutrient distribution pot 22. FIG. 1 also shows a rotation plate 8 positioned under the bottom growing pot 4 in each tower 2, riser 12 positioned between rotation plate 8 and a support plate and spacer assembly 10 at ground level in the left and right towers 2. Instead of support plate and spacer assembly 10, the middle tower 2 in FIG. 1 shows a ground pot 18 positioned below riser 12 and above ground level To add a ground pot 18, one would first place a support plate and spacer assembly 10 on the ground, add a riser 12 over the support plate and spacer assembly 10, and then slide the ground pot 18 over the spacer assembly 10 and onto its support plate 30. A rotation plate 8 is then placed over riser 12, and a support pipe inserted downwardly through rotation plate 8, riser 12, spacer assembly 10, support plate 30 (that is a part of spacer assembly 10), and may also extend into the ground. Once support pipe 6 is in its position of use, growing pots 4 may be added, as usual, to support pipe 6 above rotation plate 8. Furthermore, FIG. 1 shows a sleeve 20 covering the bottom growing pot 4 in the right tower 2 that can insulate plant roots, indefinitely protect its associated growing pot 4 from premature deterioration from solar UV radiation, and/or provide decorative enhancement. Although only one sleeve 20 is shown in FIG. 1, it is contemplated for all growing pots 4 used commercially in outdoor applications to have a protective sleeve 20. The preferred material for sleeves 20 is hard plastic (such as but not limited to polystyrene or PVC), and sleeves 20 can be thin or have any wall thickness appropriate to the intended application. FIG. 1 also shows commercial ground cover or weed control fabric 16 positioned below towers 2 at ground level to reduce/eliminate the need for weed control herbicides and soil-borne plant/crop contamination.

In contrast to FIG. 1, FIG. 2 shows five present invention towers 2 each with a differing number of growing pots 4 and risers 12 each having a different length dimension (progressively larger right-to-left), with the riser 12 selected having a length complementary to the number of growing pots 4 used, so that the topmost growing pots 4 in each tower 2 in the row become positioned at substantially the same height (for irrigation and other advantage). All towers 2 in FIG. 2 have an optional support plate and spacer assembly 10 at the base of riser 12 to prevent riser 12 from sinking into the ground, and an inner support/stake 14 extending within support pipe 6 both above and below ground level for added tower 2 for strength against damage from wind and other shearing forces. In addition, a commercial ground cover or weed control fabric 16 is also shown under towers 2 to reduce the risk of plant/crop exposure to soil-borne disease. An overhead nutrient pipe 24 is absent from FIG. 2, and no nutrient distribution pot 22 is shown, perhaps indicating a present invention embodiment intended for backyard use in a residential application. With a similarity to FIG. 2, FIG. 3 shows present invention towers 2 each having a differing number of growing pots 4 and risers 12 with complementary length dimensions (increasing from right-to-left) that preserve a substantially uniform height for all towers 2 in the row. Alphabet letters have been added in FIG. 3 next to portions of towers 2 to facilitate comparison of dimensions associated with adjacent towers 2 when differing numbers of growing pots 4 are present, with some dimensions remaining the same, and some being different. Thus, from left-to-right in FIG. 3, one sees five present invention towers 2 in a row, each having substantially the same overall height dimension B above ground cover 16 for its support pipe 6. All present invention towers 2 in FIG. 3 also the same amount of support pipe 6 extending above its topmost growing pot 4 (marked by the letter A), which provides an option of nutrient distribution pot 22 use between an overhead nutrient line (see nutrient pipe 24 in FIG. 1) and the top growing pot 4. FIG. 3 also shows the support pipe 6 in each tower 2 extending downwardly below ground cover 16 by the same depth dimension H to provide security and stability to each tower 2 against potential damage from shearing forces, a depth dimension typically about 10-to-12 feet, but determined according to a variety of factors, including but not limited to the maximum number of growing pots 4 contemplated for use, the type of soil into which support pipe 6 is inserted, the type of media used in each growing pot 4, anticipated wind conditions at the location selected for towers 2, and other weathering forces expected to affect towers 2. An inner support/stake 14 also strengthens the connection of support pipe 6 with the ground against shearing forces, shown in FIG. 3 both above and below ground cover 16, and extending below depth dimension H in each tower 2. Although many similarities exist between adjacent present invention towers 2, differences also occur, such as the variable height dimension of the potential root growth area for crops/plants (marked from left-to-right in FIG. 3 by the letters C-G, also compare to FIG. 18). Thus, FIG. 3 shows the height of root growth areas C-G increasing left-to-right, while the height dimensions of the complementary risers 12 (marked from left-to-right in FIG. 3 by the letters K-O) become smaller. Although it is not clear from the viewing angle in FIG. 13, growing pots 4 have a square cross-sectional configuration and are typically used in a stacked array wherein each growing pot 4 is rotated approximately 45-degrees from the next growing pot 4 above and below it (see FIGS. 4, 6, 14, and 15), which in combination with the precisely located arrangement of drainage holes 32, allows nutrients to be delivered to plant roots within growing pots 4 in locations that provide optimal plant growth and crop production. Even in the tower 2 shown for large plants in FIG. 18, the drip-to-excess-water/nutrient distribution still occurs with growing pots 4 angled 45-degrees relative to one another. Furthermore, FIGS. 1-3 each show towers 2 having aground cover or weed control fabric 16 beneath them, which reduces the incidence of soil-borne contamination of any fruits and vegetables grown in towers 2 that eventually come into contact with the ground, as well as reduce ground heat that could otherwise adversely affect the quality of fruits having ground contact. The ground pot 18 shown in FIG. 1 can be used for growing the same or different plants from those produced in the growing pots 4 above it, while the sleeve 20 in the rightmost present invention tower 2 in FIG. 1 protects the associated growing pot 4 from premature deterioration due to solar UV radiation, as well as inadvertent contact damage that could otherwise be experienced during planting and harvest operations. As an alternative to use of sleeve 20, a protective coating (not shown) may be substituted. Also, sleeves 20 and coatings may provide a decorative function. As mentioned hereinabove, it is contemplated for all growing pots 4 in commercial applications to have a sleeve 20 to help them achieve a useful life exceeding five years.

Figure 4:
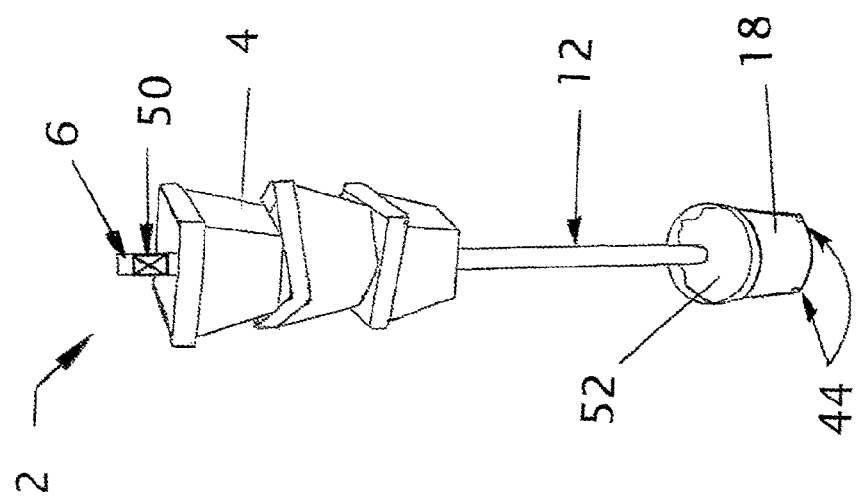
FIG. 4 is a side view of a third preferred present invention tower showing three stacked growing pots above a ground pot used to grow bonus plants/crops, or alternatively a tower-stabilizing support pot filled with weighted material, with a sleeve-type emitter holder associated with the top portion of the central support pipe.

FIG. 4 is a side view of a present invention tower 2 above a ground pot 18, which can be used to grow bonus crops/plants (not shown) or filled with concrete or similar weighted filler 52. This tower 2 may be used in residential application on a patio or roof, but not limited thereto. A riser 12 visibly extends between weighted filler 52 and the bottom growing pot 4, with three growing pots 4 shown in stacked array and rotated approximately 45-degrees from the next adjacent growing pot 4. Furthermore, on the top end of its support pipe 6 one can see an emitter holder 50 configured to fix the distal end of drip emitter 26 in a secure position during present invention use to provide for any overhead irrigation line 24 (or other forms of water/nutrient delivery) used therewith. Although other sizes and configurations emitter holder 50 are considered to be within the scope of the present invention, emitter holder 50 is preferably tubular and made from 1-inch by 3-inch black polyethylene material. The stacked growing pots 4 shown in FIG. 4 do not have the indentations 40 shown in FIGS. 14 and 15, and may also be appropriate for direct seeding applications involving smaller plants. If a shorter riser 12 is used in the tower 2 shown in FIG. 4, at least one more growing pot 4 could be added to the stacked array aligned for use by support pipe 6. Also, the ground pot 18 shown in FIG. 4 appears to have a width dimension similar to (or less than) that of the growing pots 4 above it, to not enlarge the footprint of tower 2. In contrast, FIG. 5 is a side view of a present invention low-style tower 2 with three growing pots 4 and a short riser 12 suitable for commercial strawberry production. The preferred riser 12 in lower towers 2 is approximately 1-inch in diameter and approximately 1-to-3-inches in length, but it may also have other dimensions. Although not limited thereto, the low tower 2 shown in FIG. 5 typically has a maximum height dimension of approximately 40-to-42-inches. Since no ground pot 18 is used, support pipe 6 is inserted through ground cover 16 (preferably manufactured from material made for weed control) and into the ground to provide additional vertical stability for tower 2. The preferred growing pot 4 in low towers 2 used to produce strawberries, melons, and certain vegetables, is approximately 9.25-inches square at the top and as small as 6.3-inches square at the bottom, providing a tapered construction that allows nesting and efficient handling and shipping. The preferred growing pot 4 in low towers 2 further has a square design with a tapered groove 38 in centrally located on each top edge for locking a corner of the growing pot 4 above it into a preferred position for tower 2 stability and optimum crop/plant growth, with or without a sleeve 20 surrounding growing pot 4. The preferred growing pot 4 in low towers 2 also has eight drain holes 32 placed strategically around the bottom of the present invention growing pot in a generally hexagonal configuration, with emphasis on corner drainage from one growing pot 4 to the next one below it that efficiently and economically moves water/nutrient drip (not shown) from the top growing pot 4 to the second growing pot 4, and from the second growing pot 4 to the third, after which excess nutrient drip can be collected by a ground pot 18 for other productive use. Growing pots 4 in the low tower 2 shown in FIG. 4 are also preferably designed with a ¾-inch side wall and bottom thickness dimension, and preferably manufactured from high density fused expanded polystyrene foam (HDEPS), having a minimum density of approximately 2.7 pounds per cubic foot to provide good insulation and allow it to hold up well under the weight of the growing media (not shown) it supports (which often consists of expanded coconut fiber weighing about 5-to-6-pounds per growing pot 4), as well as the increasing weight of plants/crops being produced. Furthermore, the internal volume of the preferred present invention growing pot 4 (although not limited thereto) is 1.2 gallons (or approximately 4 liters), and its bottom center opening 34 has a preferred diameter dimension of approximately 1.05-inches +/−0.05-inches, when needed to accommodate a support pipe 6 having a diameter dimension of approximately ¾-inches. In addition, internal walls of present invention growing pots 4 must be sufficiently smooth to prevent root penetration, which would defeat its desired insulating capability. Present invention growing pots in low towers 2 are preferably filled with growing are inserted into each corner of a growing pot 4 with a special tool. When used in large scale farming operations, present invention growing pots 4 in low towers 2 may be machine filled.

FIG. 6 is a top view of several preferred present invention towers 2 in a staggered row arrangement typical for field cultivation of plants/crops. Stacked growing pots 4 in both high and low towers 2 are placed in rows with spacing between towers 2 sufficient to provide needed growth room required by each plant/crop grown, and for maintenance and/or monitoring activity. In many applications, tower 2 spacing preferably ranges from 24-to-48-inches down a single row, and 18-to-30-inches down a double staggered row, as shown in FIG. 6, but could also be 42-to-48-inches, with wider row spacing allowing present invention towers 2 to fit the standard irrigation systems already in place by commercial farmers. For example, if field-grown strawberries are in raised beds with rows on 4-foot centers, one plant can take up a space of one-square-foot. In the 1-foot square space, with the same amount of water/nutrients, a present invention tower 2 can feed twelve plants, providing significant cost and environmental savings. FIG. 6 also shows ground pots 18 that can be positioned between tower 2 rows to increase yields or diversify crop/plant production without a corresponding acreage increase. However, it must be noted that the arrangement of ground pots 18 may be different from that shown in FIG. 6, depending upon the type of crops/plants grown and the space needed for proper growth, the type of irrigation used, harvesting space required, and other factors. Although not shown in FIG. 6, ground pots 18 positioned between a row of towers 2 may have an independent irrigation line, or each ground pot 18 may independently receive water/nutrient collected and diverted from a nearby tower 2, or supplemented in some other way.

FIG. 7 is a side view of a present invention support pipe 6 having a 2-piece construction that facilitates increased tower 2 height for greater plant/crop yields without an increase in acreage. The 2-piece construction also facilitates tower 2 assembly, by allowing bottom support pipe 6b to first be easily driven into the ground (typically at least 10-inches), and top support pipe 6a connected thereto after bottom support pipe 6b is securely in its usable position. The top support pipe 6a may have a ¾-inch diameter dimension, one swaged end used for connection to bottom support pipe 6b, and various length dimensions between 20-to-60-inches, while the bottom support pipe 6b may have a similar diameter dimension and also comprise different length dimensions. The swaged connection allows growing pots 4 to slide over a steel support pipe 6 without damage to growing pot 4. Support pipes 6a and 6b may each comprise EMT conduit, or a combination of EMT conduit and an outer jacket made from PVC plastic (not shown). In addition to facilitating tower 2 assembly, the two-piece construction of support pipe 6 reduces shipping cost, as both lengths (6a and 6b) can fit on a standard shipping pallet (not shown). FIG. 8 is a bottom view of a present invention growing pot 4 having a square configuration, a center hole 34 having a diameter dimension of approximately 1.05-inch through which vertically-extending support pipe 6 is inserted. Eight bottom drainage holes 32 are also present in each growing pot 4, and arranged in a hexagonal configuration. Also, although not limited thereto, the most preferred growing pot 4 is 9.25-inches square at the top and as small as 6.3-inches square at the bottom, with downwardly tapering sides that provide a nested configuration for compact storage and shipping. The eight drain holes 32 are placed strategically around the bottom of growing pot 4 with emphasis on the corner drainage for optimal availability of water/nutrients to plants in the growing pot 4 immediately below. In addition to more effective root zone placement of water/nutrients, new hole 32 placement also provides less salt build-up around the base or crown of the plant and creates less plugging of holes 32 in the bottom stacked growing pot 4 (which rests on rotation plate 8). Preferred present invention growing pots 4 also have rounded corners 42 on its upper edge to allow hands of strawberries to not be damaged on the stems (to encourage long-stem berries and a larger number of berries). Rounded corners 42 also allow tomato plants to hang without breaking their main stems. In addition, rounded corners 42 provide less damage in stacking/shipping/cleaning activity related to growing pots 4. FIG. 9 is a front view of a present invention rotation plate 8, which is shown to have a small and efficient design, with an octagonal configuration sized for positioning against the bottom growing pot 4 in a tower 2 to prevent drain holes 32 in the bottom stacked growing pot 4 from becoming obstructed. FIG. 9 is preferably made from black high-density polyethylene (HDPE) that is approximately ¼-inch thick, and has a ¾-inch diameter center hole 34 for use with a support pipe 6 having a diameter dimension of ½-inch (or a 1-inch diameter center hole 34 if support pipe 6 has a diameter dimension of ¾-inch). The black color for rotation plates 8 is preferred over a lighter color or white, to eliminate algae growth and reduce degradation from sunlight. FIG. 10 is a side view of an optional present invention support plate and spacer assembly 10, with the support plate separately identified by the numeral 30, which helps to prevent growing pots 4 from sinking into the ground as the weight of plant/crop mass increases during their growth. Support plate and spacer assembly 10 is contemplated for use with both high and low towers 2.

FIG. 11 is a side view of a preferred 2-piece support pipe 6 usable with preferred embodiments of the present invention for supporting growing pots 4 in a high tower 2 arrangement, with its two-part construction allowing top support pipe 6a to be releasably connected to bottom support pipe 6b for enhanced handling ease and lower shipping cost. The preferred maximum length dimension of bottom support pipe 6b is 60-inches, while the preferred maximum length dimension for top support pipe 6a is 30-to-60-inches (with a typical length dimension being 40-inches, as shown in FIG. 11). Also, both are preferably made from EMT conduit, although other materials could also be used, depending upon the application. When a bottom support pipe 6b having a length dimension of 60-inches is used, approximately 10-to-15-inches of its length becomes inserted into the ground below a weed control fabric or ground cover 16. FIG. 11 also shows an internal support/stake 14 partially positioned within the lower end of bottom support pipe 6b, both above ground level and below ground level to reduce adverse impact from shearing forces. FIG. 11 further shows about 4-to-5-inches of internal support/stake 14 extending into the ground downwardly beyond the lower end of bottom support pipe 6b. It is preferred for internal support/stake 14 to have a diameter dimension of approximately ½-inch (when support pipes 6a and 6b have a diameter dimension of about ¾-inch), and for most internal support/stakes 14 to have a length dimension of approximately 16-to-24-inches (commonly 20-inches). The advantages of high towers 2 include: less bending for planting and harvest, more uniform growth with easier rotation of complete towers, more room for crop versatility within one tower 2 and more opportunity for proper placement of plants according to light requirements, more production of spinach, lettuce, and herbs, more efficient use of greenhouses and high tunnels, less damage from small animals, easier and more effective spraying of plants with fungicide and insecticide (if needed), easier potting, and easier tower loading and unloading. However, when plants are healthy with optimal opportunity for growth, they are generally able to better resist insects and disease.

Figure 12:
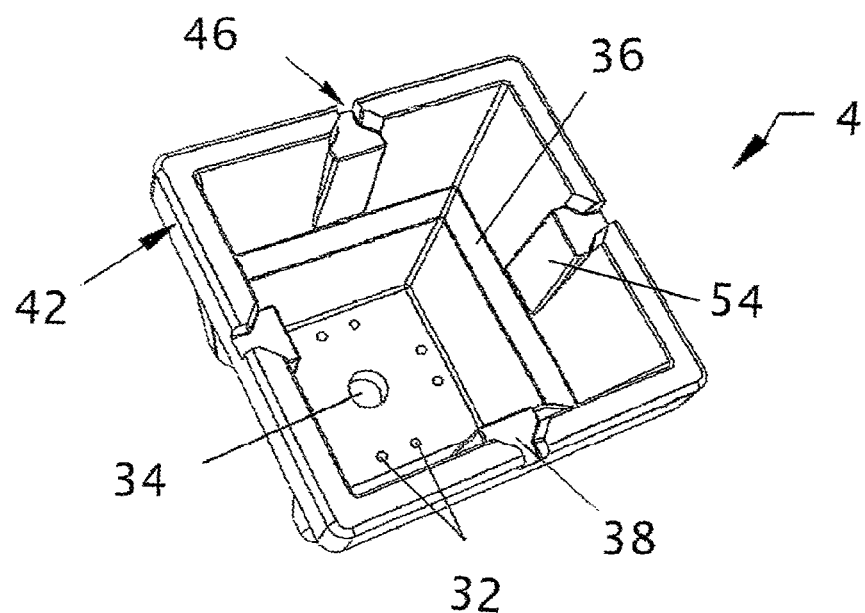
FIG. 12 is a top perspective view of a preferred growing pot usable as a part of present invention towers and shown having a tapered groove centrally through each of its four top edges, a beveled top edge that reduces plant stem breakage in hanging plants, bottom drainage holes in an octagonal configuration that promotes water/nutrient distribution into growing pot corners, and a slightly tapered top-to-bottom configuration that encourages growing pot nesting during storage, handling, and shipping
Figure 13:
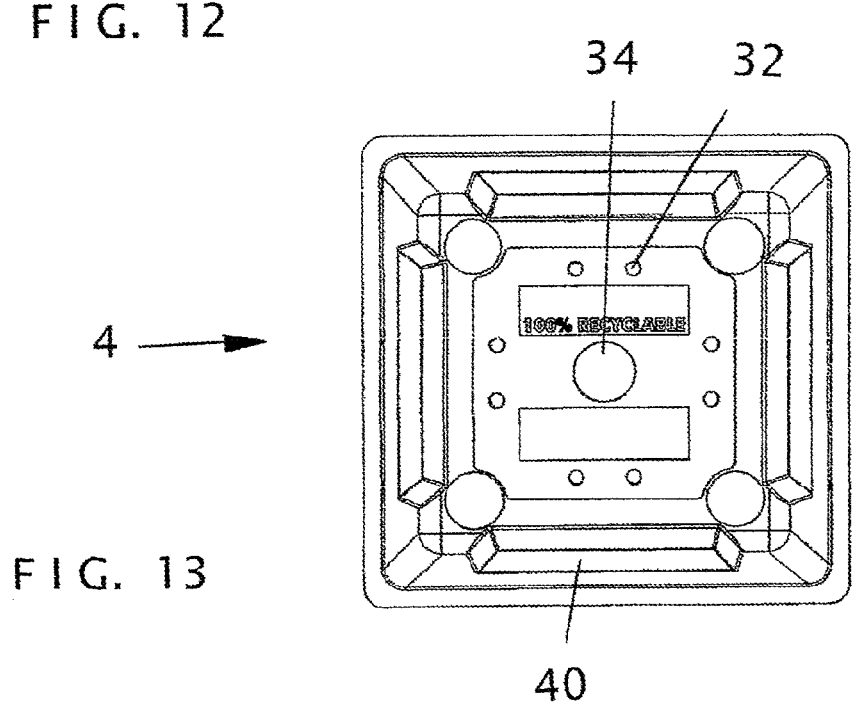
FIG. 13 is a bottom view of the growing pot shown in FIG. 12, showing its precisely positioned octagonal bottom drainage hole array, an enlarged central bottom hole for insertion of a support pipe centrally through all stacked growing pots in a present invention tower, and side indentations that strengthen growing pot construction and also assist plant growth in the next lower growing pot for seedlings planted into the adjacent corner.
Figure 14:
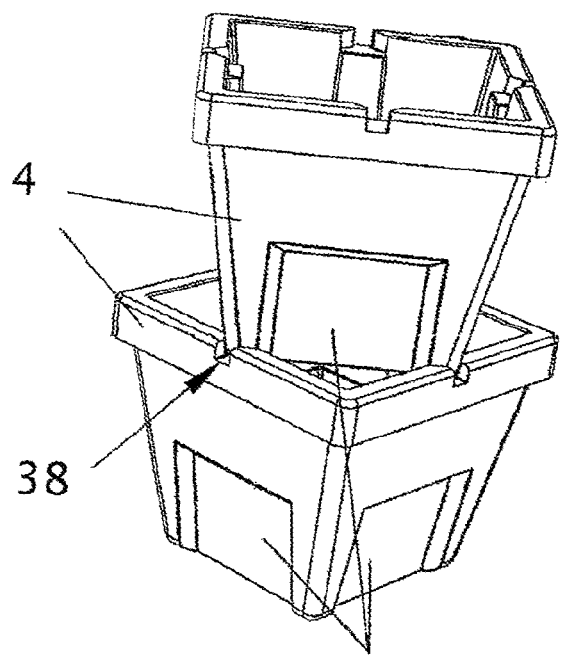
FIG. 14 is a side view of two growing pots shown in FIGS. 12 and 13 in stacked array with one rotated approximately 45-degrees relative to the other, and further showing the bottom corners of the upper growing pot secured within the tapered grooves cut centrally into the upper edges of the lower pot, and the side indentations that enhance growing pot strength ands provide additional corner space to assist growth of seedlings in the stacked growing pot below it.
Figure 15:
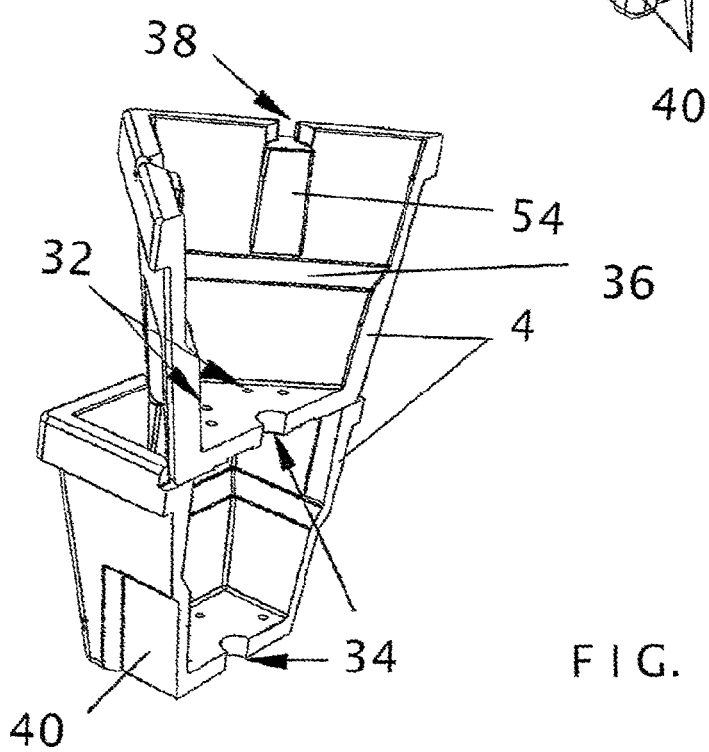
FIG. 15 is a sectional view of the two stacked present invention growing pots shown in FIG. 14, further showing the central bottom hole alignment needed for support pipe insertion, locking connection of bottom pot corners within tapered grooves in the upper edge of a next lower stacked growing pot (whether a sleeve surrounds the growing pot or not), strengthening support wedges associated with each groove to provide additional support for the bottom surface of the next higher stacked growing pot, and the additional growing pot strength and growing space provided by side indentations for the growth of seedlings in the corners of the next lower growing pot.

FIGS. 12-15 show various views of a preferred present invention growing pot 4 usable in any high or low tower 2. FIG. 12 is a top perspective view of a growing pot 4 having a rounded/beveled top edge 42, large tapered grooves 38 centrally through each top edge 42, eight bottom drainage holes 32 in an octagonal configuration (each having a diameter dimension of approximately ¼-to-3/16-inch), and a tapered top-to-bottom configuration that encourages nesting of growing pots 4 when shipped/stored. FIG. 12 also shows the groove 38 in the most preferred present invention growing pot 4 having an enlarged notch with an extension 46 that provides a locking connection between adjacent stacked growing pots 4 whether or not a sleeve 20 is used over growing pot 4. FIG. 12 further shows an inside ledge 36 and a wedge 35 both incorporated into growing pot 4 design to strengthen it, and an approximately 1-inch central bottom hole 34 (through which a ¾-inch support pipe 6 extends when several growing pots 4 are in stacked array). Growing pots 4 are made from a material and design that is lightweight, easily stackable, enhances insulation value, and can also be successfully drilled with a needed size of center hole 34 that reduces production costs. This avoids the repetitive expense to smaller commercial operations of multiple growing pot 4 molds, with the only difference between them being a center hole 34 having a different diameter dimension. Protective sleeves 20 are preferably made from hard plastic (PVC or styrene, but not limited thereto), which reduce exposure of growing pots 4 from solar UV radiation. FIG. 13 is a bottom view of the same preferred growing pot 4 shown in FIG. 12, again identifying the positioning and size of the preferred octagonal array of eight bottom drainage holes 32 in present invention growing pots 4, the large central bottom hole 34 used for insertion of a support pipe 6 centrally through all growing pots 4 in a tower 2, and four side indentations 40 that strengthen growing pot 4 and also assist the growth seedlings planted in the corners of the next lower growing pot 4 by providing it adequate room to receive adequate light and extend upwardly during initial phases of growth. FIG. 14 is a side view of two present invention growing pots 4 shown in FIGS. 12 and 13, but now in stacked array with the bottom corners of the upper growing pot 4 secured within the tapered grooves 38 formed centrally in the rounded/beveled upper edge 42 of the lower growing pot 4, which off-sets one growing pot 4 approximately 45-degrees in rotated orientation relative to the other. FIGS. 14 and 15 together also show the indentations 40 on all sides of a growing pot 4 that add to its strength and allow more space for seedling growth in the growing pot 4 below it. FIG. 15 is a sectional view of the two stacked present invention growing pots 4 shown in FIG. 14, and further shows the central bottom holes 34 in each growing pot 4 vertically aligned for insertion of a support pipe 6 centrally through both growing pots 4. In addition, FIG. 15 shows two of the octagonal array of drainage holes 32 optimally positioned for providing nutrient drip to the roots of plants/crops in the corner of the next lower growing pot 4. If the correct size of emitter tubing 26 is not provided, and the flow rate of water/nutrient drip (not shown) is not properly adjusted, and the drain holes 32 in growing pots 4 are not properly positioned and spaced apart from one another, water/nutrient can drain from one growing pot 4 downwardly to the next (at least in part) via center holes 34, failing to properly provide optimal water/nutrient availability to plant roots in the corners of growing pots 4. Although not limited to the following, some examples of plant/crop combinations grown in towers 2 using growing pots 4 include: cabbage or broccoli in a ground pot 18 and lettuce in the growing pots 4 above them; tomatoes in high towers 2; lavender or herbs in the ground pot 18 and tomatoes in the growing pots 4 above them; beans in ground pot 18, tomatoes in a center growing pot 4, and lettuce in a top growing pot 4; hanging tomatoes in high towers 2; culinary herbs in ground pots 18 grown solely with excess nutrient drip (not shown); beans in ground pots 18, with vegetables in high towers 2 above them; peppers in high towers 2; greens in high towers 2; lettuce or spinach in growing pots 4; lettuce in high towers 2 with flowers below in ground pots 18; strawberries in low towers of three growing pots 4 each; high towers 2 with lettuce in top growing pot 4 only and tomatoes in growing pots 4 below it. Furthermore, the growing pots 4 used in present invention towers 2 must be sufficiently hard and strong to resist premature deterioration from cleaning with a high-pressure washer that removes old growing media while sterilizing the entire growing pot 4 (so that they last at least five years in commercial crop production applications and help the present invention achieve competitive commercial success). Growing pots 4 should also be manufactured of materials able to withstand being dipped in sodium hypochlorite and/or other cleaning/sterilization solutions that reduce the risk of plant disease from soil contamination.

FIGS. 16 and 17 show the most preferred present invention growing pot 4 with numerical markings provided for dimensional comparison to prior art growing containers (not shown), while FIG. 18 shows a present invention tower 2 preferred for stacked growth of large plants (not shown), with two rotation plates 8 and a riser 12 between each pair of adjacent growing pots 4, and numerical markings provided for dimensional comparison. As shown in FIGS. 16 and 17, the most preferred present invention growing pots 4 are square, and the width dimension of each side thereof near its top rounded edge 42 is approximately 9.25-inches, while the width dimension of each side near its bottom edge is approximately 6.30-inches. Also, FIG. 17 shows an 8-inch preferred height dimension for the most preferred present invention growing pot 4. FIGS. 16 and 17 also show tapered grooves 38 centered on each top edge 42 of the most preferred present invention growing pot 4 (which lock adjacent growing pots 4 to one another whether a sleeve 20 surrounds growing pot 4, or not), and the indentation 40 on each side of growing pot 4 that is also laterally-centered, and has a height dimension less than half that of growing pot 4 (although not limited thereto). FIG. 16 also shows the precision spacing of drain holes 32 through the bottom of the most preferred present invention growing pots 4, which provides optimal corner water/nutrient distribution for maximum plant/crop growth in towers 2. As shown in FIG. 18, a tower 2 for large plants preferably has a two-piece support pipe 6 with a height dimension between approximately 5-feet-5-inches and 7-feet-3-inches, with approximately 10-inches of the lower length of support pipe 6 being inserted into the ground. Also, its inner support/stake 14 preferably has a length dimension between approximately 20-inches and 24-inches, with its top portion (several inches) extending into ground pot 18. FIG. 18 also shows a riser 12 between adjacent growing pots 4, and between the bottom growing pot 4 and ground pot 18, and well as two rotation plates 8 associated with each end of every riser 12. This use of risers 12 (preferably made of PVC plastic, but not limited thereto) solves the problem of plants/crops in an upper growing pot 4 shading those in the next lower growing pot 4 and reducing their yield, as well as the problem of overlapping foliage that reduces growth and increases the spread of disease. In addition, FIG. 18 shows a ground cover 16 under tower 2. Although not shown, corners of growing pots 4 in FIG. 18 are still off-set approximately 45-degrees for optimal water/nutrient drip into root zones.

Present invention towers 2 are an improvement over all other hydroponic, soil-less, or organic growing systems, and can be used anywhere in the world since no soil is required. Local sources of agricultural by-products can be used as the growing media for its growing pots 4 and ground pots 18. Savings of water, energy, and space are increasingly important to horticulture and agriculture worldwide, which the present invention towers 2 can easily achieve over in-ground field plant/crop production. If the present invention is used as directed, very little loss of water nutrients can occur, often less than 5%, as long as an irrigation timer is used and the type of crop/plant being grown is properly monitored. The present invention has also been successfully used in Aquaculture applications with bio-filters and bio-digesters, wherein plants like lettuce and strawberries are grown in pure perlite growing media and use up all of the nutrients in effluent to a point where the remaining water no longer poses an environmental threat and can be safely allowed to re-enter rivers and lakes. Other options contemplated in the present invention for disposition of excess nutrient drip include: 'drip-to-waste' where little excess drip occurs and is not collected, 'drip-to-collection' where a polyvinyl chloride (PVC) pipe connected to the ground pot at the base of a tower drains excess nutrient drip to a remote collecting area or pond, "drip-to-collection-and-re-use where excess nutrient drip is collected in an underground container and pumped to a different crop that is usually outdoors, and 'drip-and-re-circulation' where through use of a tank and return pump surplus nutrient drip not needed by growing pots 4 is re-circulated to the same crop/plants (useful in rooftop column/tower applications).

INDUSTRIAL APPLICABILITY

The vertically-extending arrangement of stacked growing pots 4 in the self-sustaining columns/towers 2 disclosed herein can be employed to grow plants/crops for commercial and home use, and make the production of certain crops and ornamental plants competitive with those grown in the field, while concurrently using less acreage, less water, less fertilizer, and having a reduced risk of soil-borne contamination. Repeat use of present invention growing pots over a minimum period of several years helps to increase its economic competitiveness with field production. The same type of crop/plant can be grown in each pot in a tower, or a mixture of crops/plants, making the present invention tower system versatile for a variety of applications. To reduce operating cost, risers 12 of differing length allow a varying number of growing pots 4 in adjacent towers 2 to maximize plant growth according to the type of types of crops/plants grown, and also allow any overhead nutrient distribution system 24 to remain at the same height regardless of the type of crop/plant grown, to avoid expensive nutrient system modification. To improve commercial viability, the present invention also comprises a new growing pot 4 design that improves drainage and reduces damage that might otherwise occur to it during shipping, transport, and handling, prolonging its useful life. Improved tower 2 rotation plates 8 also accommodate the new growing pot 4 for optimal nutrient transfer downwardly from one growing pot to the next, particularly into the corners of growing pots 4 where plant roots are secured. Optionally, towers 2 may use any combination of the following: protective sleeves 20 around its growing pots 4 to prevent premature deterioration from solar UV radiation and provide enhanced insulation, a two-part center support pipe 6 reinforced with an internal support/stake 14 at its base in high towers used outdoors, a support plate and spacer assembly 10 to keep growing pots 4 from sinking into the ground as plant mass increases, a nutrient distribution pot 22 situated above the topmost growing pot 4 in each tower 2, and/or a ground pot 18 at the base of a tower 2 that maximizes water and fertilizer use by collecting surplus water/nutrient from the bottom stacked growing pot 4 and using it for growing bonus plants/crops and/or diverting it to a remote location for additional plant/crop growth, or other use. The present invention can be used with an irrigation timer 48 and frequent crop/plant monitoring so that there is very little loss of nutrient exiting the bottom stacked growing pot, often less than 5%. Alternatively, the salt content and/or volume of surplus water/nutrient from towers 2 can be made sufficient for additional crop/plant growth in aground pot 18 associated with tower 2, or diversion to a remote location for other use. Also, if plants such as lettuce and strawberries are grown in pure perlite growing media and use up all of the nutrients in effluent to a point where the remaining water no longer poses an environmental threat, it can be safely allowed to re-enter rivers and lakes. In addition, surplus water/nutrient from towers 2 can be used in aquaculture applications with bio-filters and bio-digesters. The original plant growth tower arrangement design by Dov Ortov was not commercially viable with field production. However, with the improvements made by the inventor herein, the present invention is versatile for a variety of diverse commercial and residential applications, and provides a crop/plant growth system easily adaptable to each installation site, the available light, the type of crop/plant grown, and other economic/production needs.

What is claimed is:

1. A high tower planter growth arrangement in combination with growing media and apparatus providing drip-to-excess water and nutrient to the growing media, that employs less water, less nutrient, and less acreage per plant than in-ground field cultivation and can be used in commercial applications to grow plants and crops in an elevated position above the ground with yields of some plants and crops that are commercially competitive with those obtained via in-ground field cultivation thereof, said high tower planter growth arrangement characterized by;

a plurality of strong, rigid, and vertically-extending tower support pipes each having a diameter dimension, a top end, and a bottom end, each said tower support pipes also having a multiple-part swaged construction;

a plurality of strong and lightweight growing pots each made from high-density expanded foam having a minimum material density of approximately 2.7 pounds per cubic foot and also having minimum wall and bottom thickness dimensions of approximately three-fourths-inches, each of said growing pots also having a square top configuration with four top corners and a large square top opening, a tapering top-to-bottom configuration, a bottom surface with a central hole approximately one-fourth-inch larger than said diameter dimension of said tower support pipe, eight drain holes arranged in an octagonal pattern around said center hole for promoting water and nutrient distribution into said four top corners for enhanced root growth, said drain holes also each positioned between said center hole and a perimeter of said bottom surface with its spaced-apart distance from said center hole at least twice that of its spaced-apart distance from a side of the perimeter closest to said drain hole for promoting additional assist in water and nutrient distribution into said four top corners, said drain holes each also having a minimum diameter dimension of approximately one-fourth-of-an-inch and said drain holes that are adjacent to a same side of the perimeter of said bottom surface having a spaced-apart distance from one another of approximately one-inch, each of said growing pot also having a smooth interior surface configured to reduce root penetration from crops and plants grown therein, a beveled top edge configured to reduce plant stem breakage, four tapered grooves each centrally cut into said beveled top edge between a different pair of said four top corners, and a square bottom configuration with bottom corners each shaped and dimensioned for securely positioning within one of said centrally located tapered grooves of a lower one of said growing pots in a vertically-stacked arrangement, wherein said vertically-stacked arrangement has a maximum of approximately twelve of said growing pots one stacked upon another with all of their center holes aligned and adjacent ones of said growing pots rotated approximately 45-degrees from one another, and each of said growing pots also having side indentations configured to assist seedling growth in the lower one of said growing pots in said vertically-stacked arrangement; wherein one of said tower support pipes inserted through all said aligned center holes;

a plurality of rotation plates each having an octagonal perimeter configuration that is smaller in width dimension than that of said octagonal pattern of said drain holes in each of said growing pots and a central hole approximately one-fourth-inch larger than said diameter dimension of said tower support pipe, with at least one of said rotation plates selected and positioned beneath a bottommost pot of said growing pots in said vertically-stacked arrangement so as not to block said drain holes in said bottommost growing pot, said central hole in each of said selected rotation plates aligned with said center holes in said growing pots in said vertically-stacked arrangement, with said tower support pipe also inserted through said central hole in each of said selected rotation plates;

an inner support associated with each of said tower support pipes both above and below ground level;

a plurality of strong and rigid risers collectively having various length dimensions and each having an inside diameter dimension larger than said diameter dimension of said tower support pipes, said risers also each having an upper end and a lower end, with one of said risers selected for use with one of said tower support pipes and inserted over said tower support pipe in said vertically-stacked arrangement, wherein each of said risers having a length dimension complementary to a number of said growing pots in said vertically-stacked arrangement so that a topmost pot of said growing pots in said vertically-stacked arrangement becomes positioned at a pre-selected height below said top end of said tower support pipe, said selected riser positioned around a portion of said tower support pipe under said rotation plate, with said rotation plate remaining in close association with said upper end of said riser; and a plurality of ground pots configured for growing bonus plants and crops under said vertically-stacked arrangement, with a selected one of said ground pots associated with each of said tower support pipes, each of said ground pots also having a center bottom hole approximately one-fourth-inch larger than said diameter dimension of said tower support pipes, and said bottom end of each of said tower support pipes positioned below said ground pot selected for use therewith, wherein drip-to-excess water and nutrient applied to the growing media placed in each of said growing pots in said vertically-stacked arrangement promptly flows from said drain holes in an upper one of said growing pots into the growing media in said top corners of a lower one of said growing pots until the growing media in all of said growing pots in said vertically-stacked arrangement become fluid-saturated with little or no water and nutrient flowing into the next lower one of said growing pots via said center holes, wherein excess water and nutrient flows into said associated ground pot from said drain holes in the bottommost one of said growing pots in said vertically-stacked arrangement.

2. The tower planter growth arrangement of claim 1 further characterized by a plurality of protective sleeves each configured for covering one of said growing pots, and said tapered grooves in said top edges having an extension configured to allow said tapered grooves to receive of said bottom corners of a next higher one of said growing pots both in said vertically-stacked arrangement with and without said sleeve covering said growing pot.

3. A method for growing plants and crops in an elevated position above the ground for commercial and home use, wherein yields of some plants and crops can be commercially competitive with that obtained via field cultivation while employing less water, less nutrient, and less acreage, said method comprising the following steps:

providing a plurality of strong, rigid, and vertically-extending tower support pipes each having a diameter dimension, a top end, and a bottom end, each said tower support pipes also having a multiple-part swaged construction;

providing a plurality of strong and lightweight growing pots each made from high-density expanded foam having a minimum material density of approximately 2.7 pounds per cubic foot and also having minimum wall and bottom thickness dimensions of approximately three-fourths-inches, each of said growing pots also having a square top configuration with four top corners and a large square top opening, a tapering top-to-bottom configuration, a bottom surface with a central hole approximately one-fourth-inch larger than said diameter dimension of said tower support pipe, eight drain holes arranged in an octagonal pattern around said center hole for promoting water and nutrient distribution into said four top corners for enhanced root growth, said drain holes also each positioned between said center hole and a perimeter of said bottom surface with its spaced-apart distance from said center hole at least twice that of its spaced-apart distance from a side of the perimeter closest to said drain hole for promoting additional assist in water and nutrient distribution into said four top corners, said drain holes each also having a minimum diameter dimension of approximately one-fourth-of-an-inch and said drain holes that are adjacent to a same side of the perimeter of said bottom surface having a spaced-apart distance from one another of approximately one-inch, each of said growing pot also having a smooth interior surface configured to reduce root penetration from crops and plants grown therein, a beveled top edge configured to reduce plant stem breakage, four tapered grooves each centrally cut into said beveled top edge between a different pair of said four top corners, and a square bottom configuration with bottom corners each shaped and dimensioned for securely positioning within one of said centrally located tapered grooves of a lower one of said growing pots in a vertically-stacked arrangement, wherein said vertically-stacked arrangement has a maximum of approximately twelve of said growing pots one stacked upon another with all of their center holes aligned and adjacent ones of said growing pots rotated approximately 45-degrees from one another, and each of said growing pots also having side indentations configured to assist seedling growth in the lower one of said growing pots in said vertically-stacked arrangement; wherein one of said tower support pipes inserted through all said aligned center holes;

providing a plurality of rotation plates each having an octagonal perimeter configuration that is smaller in width dimension than that of said octagonal pattern of said drain holes in each of said growing pots and a central hole approximately one-fourth-inch larger than said diameter dimension of said tower support pipe, with at least one of said rotation plates selected and positioned beneath a bottommost pot of said growing pots in said vertically-stacked arrangement so as not to block said drain holes in said bottommost growing pot, said central hole in each of said selected rotation plates aligned with said center holes in said growing pots in said vertically-stacked arrangement, with said tower support pipe also inserted through said central hole in each of said selected rotation plates;

providing an inner support associated with each of said tower support pipes both above and below ground level;

providing a plurality of strong and rigid risers collectively having various length dimensions and each having an inside diameter dimension larger than said diameter dimension of said tower support pipes, said risers also each having an upper end and a lower end, with one of said risers selected for use with one of said tower support pipes and inserted over said tower support pipe in said vertically-stacked arrangement, wherein each of said risers having a length dimension complementary to a number of said growing pots in said vertically-stacked arrangement so that a topmost pot of said growing pots in said vertically-stacked arrangement becomes positioned at a pre-selected height below said top end of said tower support pipe, said selected riser positioned around a portion of said tower support pipe under said rotation plate, with said rotation plate remaining in close association with said upper end of said riser;

providing a plurality of ground pots configured for growing bonus plants and crops under said vertically-stacked arrangement, with a selected one of said ground pots associated with each of said tower support pipes, each of said ground pots also having a center bottom hole approximately one-fourth-inch larger than said diameter dimension of said tower support pipes, and said bottom end of each of said tower support pipes positioned below said ground pot selected for use therewith, wherein drip-to-excess water and nutrient applied to the growing media placed in each of said growing pots in said vertically-stacked arrangement promptly flows from said drain holes in an upper one of said growing pots into the growing media in said top corners of a lower one of said growing pots until the growing media in all of said growing pots in said vertically-stacked arrangement become fluid-saturated with little or no water and nutrient flowing into the next lower one of said growing pots via said center holes, wherein excess water and nutrient flows into said associated ground pot from said drain holes in the bottommost one of said growing pots in said vertically-stacked arrangement;

selecting a number of said support pipes needed for growing said crops and plants;

inserting each of said selected support pipes into the ground for a minimum distance of approximately 10-inches, with adjacent ones of said support pipes having a distance from one another of approximately 24~to-48-inches;

selecting a number of said rotation plates equal to that of said selected support pipes; selecting a number of said growing pots up to a maximum of approximately twelve to create one of said vertically-stacked arrangements for use with each of said selected support pipes according to available light and density requirements of said desired crops and plants;

selecting a number of said risers for association with each of said support pipes inserted into the ground according to a complementary height needed to place the topmost of said vertically-stacked arrangement associated with each of said support pipes at substantially the same height as topmost pots of those associated with adjacent ones of said support pipes;

associating each of said selected risers with a different one of said support pipes;

associating each of said selected rotation plates with a different one of said support pipes so that said support pipe extends through said central hole in said rotation plate and said rotation plate becomes positioned above said riser;

at least partially filling each of said selected growing pots with said plant growing media;

stacking said selected number of growing pots into said vertically-stacked arrangements wherein bottom corners become securely positioned within one of said tapered groves in a next lower one of said growing pots;

associating the one of said vertically-stacked arrangements complementary in height to said selected number of risers with one of said support pipes so that said support pipe extends through said central holes in all of said growing pots and said topmost one of said growing pots in said vertically-stacked arrangement becomes positioned at a pre-selected height below said top end of said tower support pipe;

planting at least one of said desired plants or crops into said plant growing media in each corner of all said growing pots;

adding said nutrient solution to the topmost one of said growing pots in a drip-to-excess manner so that after downward movement of said nutrient solution occurs as a result of gravity, said plants in all said growing pots in said vertically-stacked arrangement receive substantially the same amount of said nutrient solution; and using said selected rotation plate positioned beneath the bottommost one of said growing pots to cause easy rotation of all of said growing pots in said vertically-stacked arrangement at once, wherein said plants or crops associated with each of said growing pots in stacked array receives water, nutrients, and light needed for optimal plant and crop production.

4. The method of claim 3 further comprising the steps of placing said support pipes in adjacent rows, selecting and placing some of said plurality of ground pots between said adjacent rows.

\* \* \* \* \*